United States Patent … (10) Patent No.: US 11,767,401 B2
Kashiwabara et al. … (45) Date of Patent: Sep. 26, 2023

(54) GEL CONTAINING CONDENSATION PRODUCT OF REACTIVE SILICON COMPOUND

(71) Applicant: Sumitomo Chemical Company, Limited, Tokyo (JP)

(72) Inventors: Taigo Kashiwabara, Osaka (JP); Ayumi Ogawa, Kyoto (JP); Takashi Kamikawa, Osaka (JP)

(73) Assignee: Sumitomo Chemical Company, Limited, Tokyo (JP)

( * ) Notice: Subject to any disclaimer, the term of this patent is extended or adjusted under 35 U.S.C. 154(b) by 336 days.

(21) Appl. No.: 16/973,313

(22) PCT Filed: Jun. 25, 2019

(86) PCT No.: PCT/JP2019/025066
§ 371 (c)(1),
(2) Date: Dec. 8, 2020

(87) PCT Pub. No.: WO2020/004361
PCT Pub. Date: Jan. 2, 2020

(65) Prior Publication Data
US 2021/0246269 A1    Aug. 12, 2021

(30) Foreign Application Priority Data

Jun. 27, 2018  (JP) ................. 2018-122480

(51) Int. Cl.
*C08G 77/445* (2006.01)
*B01D 53/22* (2006.01)
(Continued)

(52) U.S. Cl.
CPC ......... *C08G 77/445* (2013.01); *B01D 53/228* (2013.01); *B01D 71/70* (2013.01);
(Continued)

(58) Field of Classification Search
None
See application file for complete search history.

(56) References Cited

U.S. PATENT DOCUMENTS

2003/0054257 A1  3/2003  Noda et al.
2009/0274842 A1  11/2009  Sawada et al.
(Continued)

FOREIGN PATENT DOCUMENTS

JP  04-339810 A  11/1992
JP  05-271549 A  10/1993
(Continued)

OTHER PUBLICATIONS

Kamio et al., "Preparation of high strength ion gel by formation of inorganic/organic hybrid network in ionic liquid solvent," SCEJ 49th Autumn Meeting, 2017, Nagoya, proceedings BB119, with English translation.
(Continued)

*Primary Examiner* — Jason M Greene
(74) *Attorney, Agent, or Firm* — Foley & Lardner LLP

(57) ABSTRACT

The present invention provides a gel containing a water-absorbing crosslinked polymer, and a condensate of a reactive silicon compound having at least one selected from the group consisting of an acidic dissociative group, an acidic dissociative group in a salt form, and a derivative group of an acidic dissociative group.

19 Claims, 1 Drawing Sheet

(51) Int. Cl.
  *B01D 71/70* (2006.01)
  *C07F 7/18* (2006.01)
  *C08J 3/075* (2006.01)
  *C08K 5/5419* (2006.01)

(52) U.S. Cl.
  CPC .............. *C07F 7/1804* (2013.01); *C08J 3/075* (2013.01); *C08K 5/5419* (2013.01); *C08J 2329/04* (2013.01); *C08J 2333/08* (2013.01); *C08J 2351/00* (2013.01)

(56) References Cited

U.S. PATENT DOCUMENTS

| | | | |
|---|---|---|---|
| 2013/0162942 | A1 | 6/2013 | Norris et al. |
| 2013/0293831 | A1 | 11/2013 | Norris et al. |
| 2015/0283518 | A1 | 10/2015 | Hirose et al. |
| 2020/0047115 | A1 | 2/2020 | Kashiwabara et al. |
| 2020/0407515 | A1 | 12/2020 | Yamamoto et al. |

FOREIGN PATENT DOCUMENTS

| | | | | |
|---|---|---|---|---|
| JP | 11-310720 | A | | 11/1999 |
| JP | 2000-082330 | A | | 3/2000 |
| JP | 2009-287008 | A | | 12/2009 |
| JP | 2011-178969 | | * | 9/2011 .............. C08L 33/02 |
| JP | 2011-178969 | A | | 9/2011 |
| JP | 2011-245419 | A | | 12/2011 |
| JP | 5830812 | B2 | | 11/2015 |
| JP | 5956438 | B2 | | 6/2016 |
| JP | 5982684 | B | | 8/2016 |
| WO | WO-2014/065387 | A1 | | 5/2014 |
| WO | WO-2018/179531 | A1 | | 10/2018 |
| WO | WO-2018/181682 | A1 | | 10/2018 |
| WO | WO-2019/111812 | A1 | | 6/2019 |

OTHER PUBLICATIONS

Tamaki et al., "Synthesis of IPN polymer hybrids of polystyrene gel and silica gel by an in-situ radical polymerization method," J. Mater. Chem., 1998, 8(5):1113-1115.

Tamaki et al., "Synthesis of Polystyrene and Silica Gel Polymer Hybrids Utilizing Ionic Interactions," Chem. Mater., 1999, 11:1719-1726.

Tanaka et al., "Properties of interpenetrating polymer network of epoxy resin and silica," Journal of the Adhesion Society of Japan, 2000, 36(9):376-381, with English translation.

* cited by examiner

GEL CONTAINING CONDENSATION PRODUCT OF REACTIVE SILICON COMPOUND

CROSS-REFERENCE TO RELATED APPLICATIONS

This application is the U.S. National Stage of PCT/JP2019/025066, filed Jun. 25, 2019, which claims priority to JP 2018-122480, filed Jun. 27, 2018.

TECHNICAL FIELD

The present invention relates to a gel containing a condensate of a reactive silicon compound. The gel is useful for an acidic gas separation membrane.

BACKGROUND ART

A gas membrane separation process is attracting attention in recent years because it can realize energy saving as a process for separating an acidic gas from synthetic gases synthesized in large-scale plants such as hydrogen production, urea production and the like, natural gas, exhaust gas and the like. Various acidic gas separation membranes for the gas membrane separation process are being studied. For example, patent document 1 describes a carbon dioxide gas separation membrane containing a copolymer having constitutional unit (1) derived from a cesium acrylate salt or a rubidium acrylate salt, and constitutional unit (2) derived from vinyl alcohol.

DOCUMENT LIST

Patent Document patent document 1: WO 2014/065387 A1

SUMMARY OF INVENTION

Technical Problem

Acidic gas separation membranes permit permeation of an acidic gas (e.g., carbon dioxide), and does not permit permeation of a nonacidic gas (e.g., nitrogen, hydrocarbon, hydrogen), thereby separating an acidic gas from a mixed gas containing an acidic gas and a nonacidic gas. When the pressure of gas supply to the acidic gas separation membrane is increased in an attempt to enhance the separation efficiency, a problem occurs that the amount of leakage of the nonacidic gas increases.

The present invention has been made in view of the above-mentioned situation, and aims to provide a gel useful for an acidic gas separation membrane capable of suppressing the leakage amount of a nonacidic gas during pressurization.

Solution to Problem

The present invention capable of achieving the above-mentioned object is as described below.

[1] A gel comprising a water-absorbing crosslinked polymer, and a condensate of a reactive silicon compound having at least one selected from the group consisting of an acidic dissociative group, an acidic dissociative group in a salt form, and a derivative group of an acidic dissociative group.

[2] The gel of the aforementioned [1], wherein the reactive silicon compound is a compound represented by the formula (I):

wherein $R^1$ is an alkyl group optionally having substituent(s), an aryl group optionally having substituent(s), a halogen atom, a hydroxy group, or an alkoxy group optionally having substituent(s), $R^2$ and $R^3$ are each independently a halogen atom, a hydroxy group, or an alkoxy group optionally having substituent(s), and $R^4$ is an organic group having at least one selected from the group consisting of an acidic dissociative group, an acidic dissociative group in a salt form, and a derivative group of an acidic dissociative group, the aforementioned organic group is an alkyl group optionally having substituent(s) or a cycloalkyl-alkyl group optionally having substituent(s), and one or more carbon atoms (excluding carbon atom adjacent to silicon atom and carbon atom adjacent to nitrogen atom) of the aforementioned alkyl group or the aforementioned cycloalkyl-alkyl group is/are optionally substituted by a nitrogen atom.

[3] The gel of the aforementioned [2], wherein $R^4$ is an organic group having at least one selected from the group consisting of a carboxy group, a carboxy group in a salt form, an alkoxycarbonyl group optionally having substituent(s), a carbonyloxycarbonyl group, and a carbonyliminocarbonyl group optionally having substituent(s).

[4] The gel of any one of the aforementioned [1] to [3], wherein the water-absorbing crosslinked polymer has at least one selected from the group consisting of an acidic dissociative group, an acidic dissociative group in a salt form, and a derivative group of an acidic dissociative group.

[5] The gel of any one of the aforementioned [1] to [3], wherein the water-absorbing crosslinked polymer has at least one selected from the group consisting of a carboxy group, a carboxy group in a salt form and an alkoxycarbonyl group.

[6] The gel of any one of the aforementioned [1] to [5], wherein the condensate of the reactive silicon compound and the water-absorbing crosslinked polymer form an interpenetrating network.

[7] An acidic gas separation membrane comprising the gel of any one of the aforementioned [1] to [6].

[8] An acidic gas separation apparatus comprising the acidic gas separation membrane of the aforementioned [7].

[9] A method for separating at least one acidic gas, comprising contacting a mixed gas comprising the aforementioned acidic gas and at least one nonacidic gas with the acidic gas separation membrane of the aforementioned [7].

[10] A method for producing the gel of any one of the aforementioned [1] to [6], comprising forming a second condensate of a reactive silicon compound having at least one selected from the group consisting of an acidic dissociative group, an acidic dissociative group in a salt form, and a derivative group of an acidic dissociative group by drying and heating a mixture comprising at least one selected from the group consisting of a reactive silicon compound having at least one selected from the group consisting of an acidic dissociative group, an acidic dissociative group in a salt form, and a derivative group of an acidic dissociative group, and a first condensate of a reactive silicon compound having at least one selected from the group consisting of an acidic dissociative group, an acidic dissociative group in a salt form, and a derivative group of an acidic dissociative group, a water-absorbing crosslinked polymer, and
water.

Advantageous Effects of Invention

Using the gel of the present invention for an acidic gas separation membrane, the leakage amount of a nonacidic gas during pressurization can be suppressed.

DESCRIPTION OF EMBODIMENTS

Figure 1:
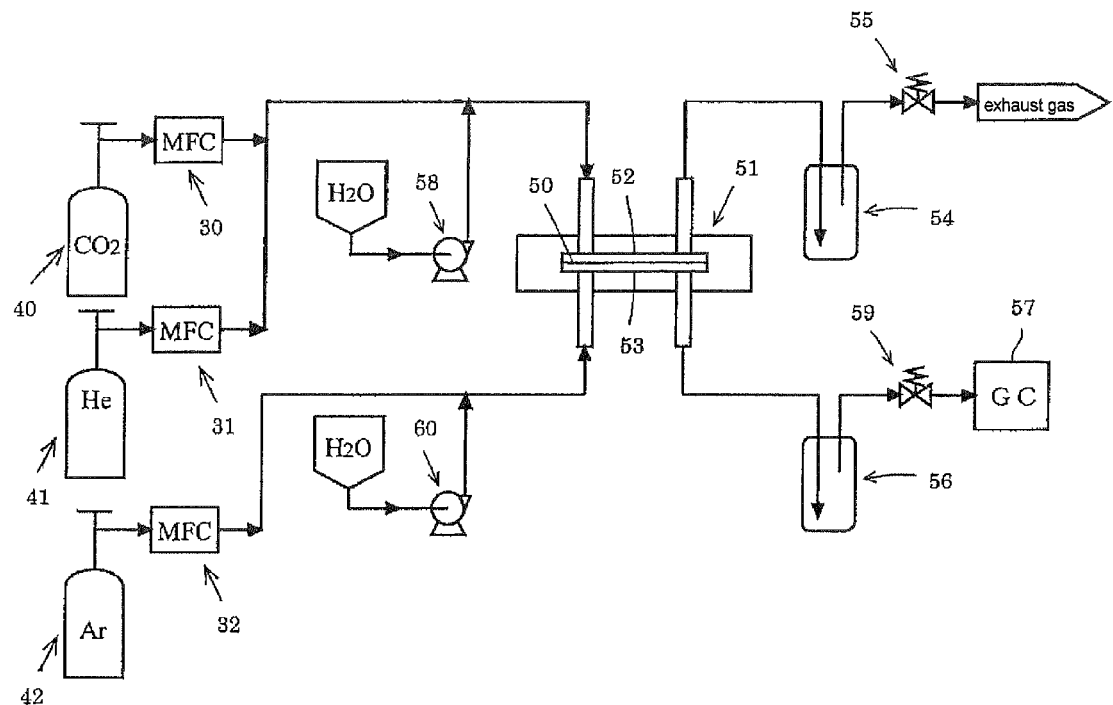
FIG. 1 is a schematic drawing of the apparatus used for evaluation of the gas separation performance of the gas separation membranes obtained in the Examples and Comparative Examples.

The present invention is sequentially described in the following. In the following, the "compound represented by the formula (I)" is sometimes abbreviated as "compound (I)". Compounds and the like represented by other formulas are sometimes abbreviated in the same manner. In addition, examples, preferred description, and the like described later can be combined as long as they do not contradict each other.

<Group of Compound>

First, the groups and the like that the compound used in the present invention may have are described.

In the present specification, "$C_{x-y}$" means that the carbon number is not less than x and not more than y (x and y show numbers).

Examples of the halogen atom include fluorine atom, a chlorine atom, bromine atom and iodine atom.

The alkyl group may be either linear or branched chain. The carbon number of the alkyl group is preferably 1-30, more preferably 1-20, further preferably 1-14, particularly preferably 1-10. Examples of the alkyl group include methyl group, ethyl group, propyl group, isopropyl group, butyl group, isobutyl group, sec-butyl group, tert-butyl group, pentyl group, isopentyl group, neopentyl group, 1-ethylpropyl group, hexyl group, isohexyl group, 1,1-dimethylbutyl group, 2,2-dimethylbutyl group, 3,3-dimethylbutyl group and 2-ethylbutyl group. The alkyl group optionally has substituent(s). Examples of the substituent thereof include halogen atom, hydroxy group, carboxy group, carboxy group in a salt form, alkoxycarbonyl group, carbonyloxycarbonyl group, carbonyliminocarbonyl group optionally having substituent(s), amino group optionally having substituent(s), and aryl group optionally having substituent(s).

The carbon number of the aryl group is preferably 6-18, more preferably 6-14, further preferably 6-10. Examples of the aryl group include phenyl group, 1-naphthyl group, 2-naphthyl group, 1-anthryl group, 2-anthryl group, 9-anthryl group. The aryl group optionally has substituent(s). Examples of the substituent thereof include halogen atom, hydroxy group, carboxy group, carboxy group in a salt form, alkoxycarbonyl group, carbonyloxycarbonyl group, carbonyliminocarbonyl group optionally having substituent(s), alkyl group optionally having substituent(s), amino group optionally having substituent(s).

In the present specification, the "cycloalkyl-alkyl group" means an alkyl group bonded to a cycloalkyl group. The alkyl group forming a part of the cycloalkyl-alkyl group is as described above. The carbon number of the cycloalkyl group is preferably 3-20, more preferably 3-10, further preferably 5-10, particularly preferably 5 or 6. Examples of the cycloalkyl group include cyclopropyl group, cyclobutyl group, cyclopentyl group, cyclohexyl group, cycloheptyl group, cyclooctyl group, bicyclo[2.2.1]heptyl group, bicyclo[2.2.2]octyl group, bicyclo[3.2.1]octyl group, and adamantyl group. The cycloalkyl-alkyl group optionally has substituent(s). Examples of the substituent capable of bonding to the cycloalkyl moiety of the cycloalkyl-alkyl group include halogen atom, hydroxy group, carboxy group, carboxy group in a salt form, alkoxycarbonyl group, carbonyloxycarbonyl group, carbonyliminocarbonyl group optionally having substituent(s), alkyl group optionally having substituent(s), amino group optionally having substituent(s), and aryl group optionally having substituent(s). Examples of the substituent capable of bonding to the alkyl moiety of the cycloalkyl-alkyl group include halogen atom, hydroxy group, carboxy group, carboxy group in a salt form, alkoxycarbonyl group, carbonyloxycarbonyl group, carbonyliminocarbonyl group optionally having substituent(s), amino group optionally having substituent(s), and aryl group optionally having substituent(s).

The alkylene group may be either linear or branched chain. The carbon number of the alkylene group is preferably 1-10, more preferably 1-6, further preferably 1-3. Examples of the alkylene group include —$CH_2$—, —$(CH_2)_2$—, —$(CH_2)_3$—, —$(CH_2)_4$—, —$(CH_2)_5$—, —$(CH_2)_6$—, —$CH(CH_3)$—, —$C(CH_3)_2$—, —$CH(C_2H_5)$—, —$CH(C_3H_7)$—, —$CH(CH(CH_3)_2)$—, —$(CH(CH_3))_2$—, —$CH_2$—$CH(CH_3)$—, —$CH(CH_3)$—$CH_2$—, —$CH_2$—$CH_2$—$C(CH_3)_2$—, —$C(CH_3)_2$—$CH_2$—$CH_2$—, —$CH_2$—$CH_2$—$CH_2$—$C(CH_3)_2$— and —$C(CH_3)_2$—$CH_2$—$CH_2$—$CH_2$—.

The explanation of an alkyl group forming one part of the alkoxy group (i.e., alkyloxy group) is as mentioned above. Preferable examples of the alkoxy group include methoxy group, ethoxy group, propoxy group, isopropoxy group, butoxy group, isobutoxy group, sec-butoxy group, tert-butoxy group, pentyloxy group and hexyloxy group. The alkoxy group optionally has substituent(s). Examples of the substituent thereof include halogen atom, hydroxy group, carboxy group, carboxy group in a salt form, alkoxycarbonyl group, carbonyloxycarbonyl group, carbonyliminocarbonyl group optionally having substituent(s), amino group optionally having substituent(s), aryl group optionally having substituent(s).

Preferable examples of the carboxy group in a salt form include carboxy group in an alkali metal salt form.

Examples of the alkali metal include lithium, sodium, potassium, rubidium, and cesium. Among these, sodium, potassium, and cesium are preferable, sodium and cesium are more preferable, and cesium is more preferable.

Preferable examples of the alkoxy-carbonyl group include methoxycarbonyl group, ethoxycarbonyl group, propoxycarbonyl group, isopropoxycarbonyl group, butoxycarbonyl group, isobutoxycarbonyl group, sec-butoxycarbonyl group, tert-butoxycarbonyl group, pentyloxycarbonyl group and hexyloxycarbonyl group. The alkoxy-carbonyl group optionally has substituent(s). Examples of the substituent thereof include halogen atom, hydroxy group and amino group optionally having substituent(s).

In the present specification, the "carbonyloxycarbonyl group" means a group represented by —CO—O—CO—. This group is sometimes called an acid anhydride group.

In the present specification, the "carbonyliminocarbonyl group optionally having substituent(s)" means a group represented by —CO—NR—CO— (wherein R is a hydrogen atom or a substituent). Examples of the aforementioned substituent include alkyl group optionally having substituent(s), and aryl group optionally having substituent(s).

Examples of the amino group optionally having substituent(s) include amino group, mono- or di-alkylamino group (e.g., methylamino group, dimethylamino group, ethylamino group, diethylamino group, propylamino group, dibutylamino group), mono- or di-cycloalkylamino group (e.g., cyclopropylamino group, cyclohexylamino group), mono- or di-arylamino group (e.g., phenylamino group), mono- or di-aralkylamino group (e.g., benzylamino group, dibenzylamino group), and heterocyclic amino group (e.g., pyridylamino group).

Preferable examples of the optionally substituted amino group include amino group and mono- or di-alkylamino group (e.g., methylamino group, dimethylamino group, ethylamino group, diethylamino group, propylamino group, dibutylamino group). It is more preferably amino group, methylamino group or dimethylamino group.

<Gel>

The gel of the present invention contains a condensate of a reactive silicon compound having at least one selected from the group consisting of an acidic dissociative group, an acidic dissociative group in a salt form, and a derivative group of an acidic dissociative group (hereinafter sometimes to be abbreviated as "an acidic dissociative group, etc."), and a water-absorbing crosslinked polymer.

<Condensate of Reactive Silicon Compound>

One of the features of the present invention is the use of a condensate of a reactive silicon compound having an acidic dissociative group, etc. In the following, "a reactive silicon compound having at least one selected from the group consisting of an acidic dissociative group, an acidic dissociative group in a salt form, and a derivative group of an acidic dissociative group" is sometimes indicated as "the reactive silicon compound of the present invention". In addition, the "condensate of a reactive silicon compound having at least one selected from the group consisting of an acidic dissociative group, an acidic dissociative group in a salt form, and a derivative group of an acidic dissociative group" contained in the gel of the present invention is sometimes indicated as "the condensate of the present invention".

In the present specification, the "reactive silicon compound" means a silicon compound having a hydroxy group and/or a hydrolyzable group on a silicon atom, and capable of forming a condensate by dehydration condensation involving the aforementioned hydroxy group and/or a hydroxy group obtained by hydrolysis of the aforementioned hydrolyzable group. In addition, the "hydrolyzable group" means a group capable of forming a hydroxy group by hydrolysis. Examples of the hydrolyzable group include halogen atom, and alkoxy group optionally having substituent(s). Only one kind of the reactive silicon compound may be used, or two or more kinds thereof may be used. The reactive silicon compound may have only one kind of hydrolyzable group or may have two or more kinds of hydrolyzable groups.

The reactive silicon compound of the present invention preferably contains a reactive silicon compound having two or three groups selected from the group consisting of a hydroxy group and a hydrolyzable group per one silicon atom, and having at least one selected from the group consisting of an acidic dissociative group, an acidic dissociative group in a salt form, and a derivative group of an acidic dissociative group; more preferably contains a reactive silicon compound having three groups selected from the group consisting of a hydroxy group and a hydrolyzable group per one silicon atom, and having at least one selected from the group consisting of an acidic dissociative group, an acidic dissociative group in a salt form, and a derivative group of an acidic dissociative group; and further preferably consists of a reactive silicon compound having three hydrolyzable groups per one silicon atom, and having at least one selected from the group consisting of an acidic dissociative group, an acidic dissociative group in a salt form, and a derivative group of an acidic dissociative group.

The reactive silicon compound used in the present invention has an acidic dissociative group, etc. The condensate contained in the gel of the present invention also has an acidic dissociative group, etc.

In the present specification, the "acidic dissociative group" means an acidic functional group capable of releasing proton ($H^+$) in water. Examples thereof include carboxy group (—COOH), sulfo group (—$S(O)_2(OH)$), phosphono group (—$P(O)(OH)_2$) and phosphonooxy group (—O—$P(O)(OH)_2$).

The acidic dissociative group may be, for example, a salt form such as —$COOM^1$, —$S(O)_2(OM^2)$, —$P(O)(OM^3)(OM^1)$, —O—$P(O)(OM^4)(OM'^2)$ (in the aforementioned formulas, $M^1$-$M^4$ are each independently a cation different from a proton (hereinafter sometimes to be abbreviated as "other cation"), and $M'^1$ and $M'^2$ are each independently a proton (hydrogen atom) or other cation) or the like. Examples of other cation include metal ion (metal atom) and ammonium ion. Examples of the metal ion (metal atom) include alkali metal ion (alkali metal atom). Other cation is preferably alkali metal ion, more preferably sodium ion, potassium ion or cesium ion, further preferably sodium ion or cesium ion, particularly preferably cesium ion.

Examples of the derivative group of the acidic dissociative group include a group that is hydrolyzed to form an acidic dissociative group or an acidic dissociative group in a salt form. Examples of such group include —$COOR^{a1}$, —CO—O—CO—O—CO—$NR'^{a1}$—CO—, —$S(O)_2(OR^{a2})$, —$P(O)(OR^{a3})(OR'^{a2})$, —O—$P(O)(OR^{a4})(OR'^{a3})$, —$CON(R'^{a4})(R'^{a5})$, —$S(O)_2N(R'^{a6})(R'^{a7})$, —$P(O)\{N(R'^{a8})(R'^{a9})\}\{N(R'^{a10})(R'^{a11})\}$, —O—$P(O)\{N(R'^{a12})(R'^{a13})\}\{N(R'^{a14})(R'^{a15})\}$ (in the aforementioned formulas, $R^{a1}$-$R^{a4}$ are each independently an alkyl group optionally having substituent(s) or an aryl group optionally having substituent(s), and $R'^{a1}$-$R'^{a15}$ are each independently a hydrogen atom or an alkyl group optionally having substituent(s) or an aryl group optionally having substituent(s)).

The reactive silicon compound of the present invention preferably has at least one selected from the group consisting of a carboxy group, a carboxy group in a salt form, an alkoxycarbonyl group, a carbonyloxycarbonyl group, a carbonyliminocarbonyl group optionally having substituent(s), and a carbonyliminocarbonyl group optionally having substituent(s).

In condensation of the reactive silicon compound of the present invention is a compound other than the reactive silicon compound of the present invention may be used in combination. That is, the condensate of the present invention optionally has a structure derived from other compound. Only one kind of other compound may be used, or two or more kinds thereof may be used. Examples of such other compound include tetraalkoxysilane, alkoxyaluminum, alkoxytitanium, and alkoxyzirconium. Among these, tetraalkoxysilane is preferable. Examples of the tetraalkoxysilane include tetramethoxysilane, tetraethoxysilane, and tetraisopropoxysilane. The condensate of the present invention is preferably free of a structure derived from other compound (that is, the condensate of the present invention consists of a structure derived from the reactive silicon compound of the present invention).

In the condensate of the present invention, the amount of the structure derived from other compound is preferably 0-50 mol, more preferably 0-30 mol, further preferably 0-10 mol, per 100 moles of the structure derived from the reactive silicon compound of the present invention. The condensate of the present invention is particularly preferably free of a structure derived from other compound.

The gel of the present invention contains a condensate of a reactive silicon compound having at least one selected from the group consisting of an acidic dissociative group, an acidic dissociative group in a salt form, and a derivative group of an acidic dissociative group. Whether the gel contains the aforementioned condensate can be determined by, for example, solid $^{29}Si$ NMR measurement. Specifically, when any of the signals T1, T2, T3, D1 and D2 is observed in the $^{29}Si$ NMR measurement of the gel, gel is determined to contain the aforementioned condensate. The assignment of these signals is described in, for example, NEW GLASS, Vol. 28, No. 109, 2013, pp. 17-28.

From the aspect of suppression of the amount of leakage of nonacidic gas, the gel of the present invention preferably has an interpenetrating network formed by the condensate of the present invention and a water-absorbing crosslinked polymer. As used herein, the "interpenetrating network" means a structure formed by network structures of two or more kinds of crosslinked products that are entangled basically without via a covalent bond. Such structure is sometimes called an interpenetrating polymer network. In the interpenetrating network of the gel of the present invention, the condensate of the present invention and a water-absorbing crosslinked polymer may form a covalent bond.

A gel having an interpenetrating network can be produced, for example, by drying and heating a mixture of water, a water-absorbing crosslinked polymer, and at least one selected from the group consisting of a reactive silicon compound having three groups selected from the group consisting of a hydroxy group and a hydrolyzable group, and a condensate of the aforementioned reactive silicon compound.

The reactive silicon compound of the present invention is preferably a compound represented by the formula (I):

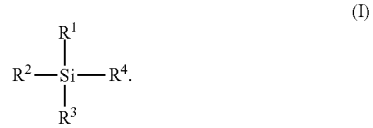

(I)

Only one kind of compound (I) may be used, or two or more kinds thereof may be used.

$R^1$ is an alkyl group optionally having substituent(s), an aryl group optionally having substituent(s), a halogen atom, a hydroxy group, or an alkoxy group optionally having substituent(s). $R^1$ is preferably a $C_{1-6}$ alkyl group optionally having substituent(s), a $C_{6-10}$ aryl group optionally having substituent(s), a halogen atom, a hydroxy group, or a $C_{1-6}$ alkoxy group optionally having substituent(s), more preferably a $C_{1-6}$ alkyl group, a $C_{6-10}$ aryl group, a halogen atom, a hydroxy group, or a $C_1s$ alkoxy group, further preferably a $C_{1-3}$ alkyl group, a phenyl group, a chlorine atom, a hydroxy group, or a $C_{1-3}$ alkoxy group.

$R^2$ and $R^3$ are each independently a halogen atom, a hydroxy group, or an alkoxy group optionally having substituent(s). Preferably, $R^2$ and $R^3$ are each independently a halogen atom, a hydroxy group, or a $C_{1-6}$ alkoxy group optionally having substituent(s), more preferably a halogen atom, a hydroxy group, or a $C_{1-6}$ alkoxy group, further preferably a chlorine atom, a hydroxy group, or a $C_{1-3}$ alkoxy group.

$R^4$ is an organic group having at least one selected from the group consisting of an acidic dissociative group, an acidic dissociative group in a salt form, and a derivative group of an acidic dissociative group, the aforementioned organic group is an alkyl group optionally having substituent(s) or a cycloalkyl-alkyl group optionally having substituent(s), and one or more carbon atoms (excluding carbon atom adjacent to silicon atom and carbon atom adjacent to nitrogen atom) of the aforementioned alkyl group or the aforementioned cycloalkyl-alkyl group is/are optionally substituted by a nitrogen atom. As used herein, that the carbon atom of the alkyl group or cycloalkyl-alkyl group is substituted by a nitrogen atom means that a primary carbon atom, a secondary carbon atom and a tertiary carbon atom in the alkyl group or cycloalkyl-alkyl group are each replaced by the corresponding nitrogen atom. For example, in the case of primary carbon atom, it means that —$CH_3$ is replaced by —$NR_2$ (wherein R is a hydrogen atom or a substituent).

The organic group for $R^4$ preferably has at least one selected from the group consisting of a carboxy group, a carboxy group in a salt form, an alkoxycarbonyl group, a carbonyloxycarbonyl group, a carbonyliminocarbonyl group optionally having substituent(s), and a carbonyliminocarbonyl group optionally having substituent(s); more preferably has at least one selected from the group consisting of a carboxy group, a carboxy group in an alkali metal salt form, a methoxycarbonyl group, an ethoxycarbonyl group, a carbonyloxycarbonyl group, and carbonyliminocarbonyl group optionally having a methyl group, an ethyl group or a phenyl group as substituent(s); and further preferably has at least one selected from the group consisting of a carboxy group, a carboxy group in an alkali metal salt form, and a carbonyloxycarbonyl group.

The organic group for $R^4$ is preferably a $C_{1-14}$ alkyl group optionally having substituent(s) or a $C_{5-10}$ cycloalkyl-$C_{1-14}$ alkyl group optionally having substituent(s), and one or more carbon atoms (excluding carbon atom adjacent to silicon atom and carbon atom adjacent to nitrogen atom) of the aforementioned alkyl group or the aforementioned cycloalkyl-alkyl group is/are optionally substituted by a nitrogen atom. In this embodiment, the number of the carbon atom (excluding carbon atom adjacent to silicon atom and carbon atom adjacent to nitrogen atom) that may be substituted by a nitrogen atom in the aforementioned alkyl group or the aforementioned cycloalkyl-alkyl group is preferably an integer of 1-3, more preferably 1 or 2.

The organic group for $R^4$ is more preferably a $C_{1-10}$ alkyl group optionally having substituent(s) or a $C_{5-10}$ cycloalkyl-$C_{1-10}$ alkyl group optionally having substituent(s), and one or more carbon atoms (excluding carbon atom adjacent to silicon atom and carbon atom adjacent to nitrogen atom) of the aforementioned alkyl group or the aforementioned cycloalkyl-alkyl group is/are optionally substituted by a nitrogen atom. In this embodiment, the number of the carbon atom (excluding carbon atom adjacent to silicon atom and carbon atom adjacent to nitrogen atom) that may be substituted by a nitrogen atom in the aforementioned alkyl group or the aforementioned cycloalkyl-alkyl group is preferably an integer of 1-3, more preferably 1 or 2.

The organic group for $R^4$ is further preferably a $C_{1-10}$ alkyl group or a $C_{5-10}$ cycloalkyl-$C_{1-10}$ alkyl group, and one or two carbon atoms (excluding carbon atom adjacent to silicon atom and carbon atom adjacent to nitrogen atom) of the aforementioned alkyl group or the aforementioned cycloalkyl-alkyl group is/are optionally substituted by a nitrogen atom.

Compound (I) is preferably at least one selected from the group consisting of compounds represented by the formula (Ia)-the formula (Im):

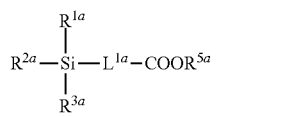
(Ia)

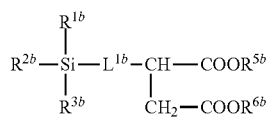
(Ib)

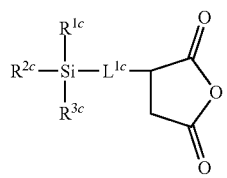
(Ic)

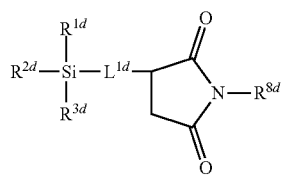
(Id)

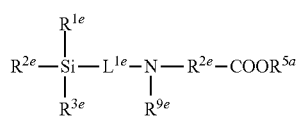
(Ie)

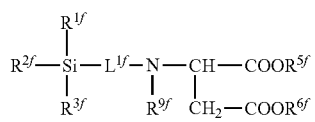
(If)

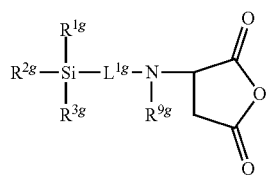
(Ig)

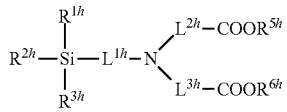
(Ih)

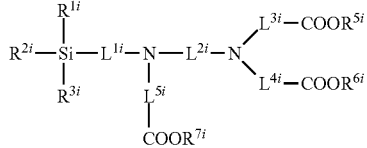
(Ii)

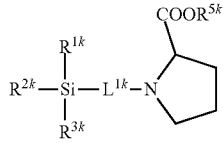
(Ik)

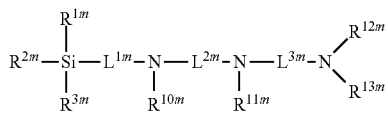
(Im)

wherein $R^{1a}$, $R^{1b}$, $R^{1c}$, $R^{1d}$, $R^{1e}$, $R^{1f}$, $R^{1g}$, $R^{1h}$, $R^{1i}$, $R^{1k}$, and $R^{1m}$ are each independently a $C_{1-6}$ alkyl group, a halogen atom, a hydroxy group, or a $C_{1-6}$ alkoxy group, $R^{2a}$, $R^{3a}$, $R^{2b}$, $R^{3b}$, $R^{2c}$, $R^{3c}$, $R^{2d}$, $R^{3d}$, $R^{2e}$, $R^{3e}$, $R^{2f}$, $R^{3f}$, $R^{2g}$, $R^{3g}$, $R^{2h}$, $R^{3h}$, $R^{2i}$, $R^{3i}$, $R^{2k}$, $R^{3k}$, $R^{2m}$ and $R^{3m}$ are each independently a halogen atom, a hydroxy group, or a $C_{1-6}$ alkoxy group, $L^{1a}$, $L^{1b}$, $L^{1c}$, $L^{1d}$, $L^{1e}$, $L^{2e}$, $L^{1f}$, $L^{1g}$, $L^{1h}$, $L^{2h}$, $L^{3h}$, $L^{1i}$, $L^{2i}$, $L^{3i}$, $L^{4i}$, $L^{5i}$, $L^{1k}$, $L^{1m}$, $L^{2n}$, and $L^{3m}$ are each independently a $C_{1-10}$ alkylene group, $R^{5a}$, $R^{5b}$, $R^{6b}$, $R^{5e}$, $R^{5f}$, $R^{6f}$, $R^{5h}$, $R^{6h}$, $R^{5i}$, $R^{6i}$, $R^{7i}$ and $R^{5k}$ are each independently a hydrogen atom, an alkali metal atom or a $C_{1-6}$ alkyl group, $R^{8d}$ is a hydrogen atom, a $C_{1-6}$ alkyl group or a $C_{6-10}$ aryl group, $R^{9e}$, $R^{9f}$ and $R^{9g}$ are each independently a hydrogen atom or a $C_{1-6}$ alkyl group, $R^{10m}$, $R^{11m}$, $R^{12m}$ and $R^{13m}$ are each independently a hydrogen atom, a $C_{1-6}$ alkyl group or $-L^{4m}$-$COOR^{5m}$, provided that at least one of $R^{10m}$, $R^{11m}$, $R^{12m}$ and $R^{13m}$ is $-L^{4m}$-$COOR^{5m}$, $L^{4m}$ is a $C_{1-10}$ alkylene group, and $R^{5m}$ is a hydrogen atom, an alkali metal atom or a $C_{1-6}$ alkyl group, and when two or more $-L^{4m}$-$COOR^{5m}$ are present, plural $L^{4m}$ may be the same as or different from each other, and plural $R^{5m}$ may be the same or different from each other. Only one kind of each of compound (Ia) to compound (Im) may be used, or two or more kinds thereof may be used.

In the present specification, "the formula (Ia)-the formula (Im)" means "the formula (Ia), the formula (Ib), the formula (Ic), the formula (Id), the formula (Ie), the formula (If), the formula (Ig), the formula (Ih), the formula (Ii), the formula (Ik) and the formula (Im)". The "compound (Ia)-compound (Im)" also means the same.

Compound (I) is more preferably at least one selected from the group consisting of compound (Ia), compound (Ib), compound (Ic), compound (Ie), compound (Ih) and compound (Im), further preferably at least one selected from the group consisting of compound (Ia), compound (Ib), compound (Ic), compound (Ie) and compound (Im), particularly preferably at least one selected from the group consisting of compound (Ia), compound (Ic), compound (Ie) and compound (Im), most preferably at least one selected from the group consisting of compound (Ia), compound (Ic) and compound (Ie).

$R^{1a}$, $R^{1b}$, $R^{1c}$, $R^{1d}$, $R^{1e}$, $R^{1f}$, $R^{1g}$, $R^{1h}$, $R^{1k}$ and $R^{1m}$ are each independently preferably a $C_{1-3}$ alkyl group, a chlorine atom, a hydroxy group, or a $C_{1-3}$ alkoxy group, more preferably a $C_{1-3}$ alkyl group, a chlorine atom, a hydroxy group, a methoxy group or an ethoxy group.

$R^{2a}$, $R^{3a}$, $R^{2b}$, $R^{3b}$, $R^{2c}$, $R^{3c}$, $R^{2d}$, $R^{3d}$, $R^{2e}$, $R^{3e}$, $R^{2f}$, $R^{3f}$, $R^{2g}$, $R^{3g}$, $R^{2h}$, $R^{3h}$, $R^{2i}$, $R^{3i}$, $R^{2k}$, $R^{3k}$, $R^{2m}$ and $R^{3m}$ are each independently preferably a chlorine atom, a hydroxy group, or a $C_{1-3}$ alkoxy group, more preferably a chlorine atom, a hydroxy group, a methoxy group or an ethoxy group.

$L^{1a}$, $L^{1b}$, $L^{1c}$, $L^{1d}$, $L^{1e}$, $L^{2e}$, $L^{1f}$, $L^{1g}$, $L^{1h}$, $L^{2h}$, $L^{3h}$, $L^{1i}$, $L^{2i}$, $L^{3i}$, $L^{4i}$, $L^{5i}$, $L^{1k}$, $L^{1m}$, $L^{2m}$, $L^{3m}$ and $L^{4m}$ are each independently preferably a $C_{1-6}$ alkylene group, more preferably a $C_{1-3}$ alkylene group.

$R^{5a}$, $R^{5b}$, $R^{6b}$, $R^{5e}$, $R^{5f}$, $R^{6f}$, $R^{5h}$, $R^{6h}$, $R^{5i}$, $R^{6i}$, $R^{7i}$, $R^{5k}$ and $R^{5m}$ are each independently preferably a hydrogen atom, an alkali metal atom or a $C_{1-3}$ alkyl group, more preferably hydrogen atom, alkali metal atom, a methyl group or an ethyl group, still more preferably a hydrogen atom, a cesium atom, a sodium atom, a methyl group or an ethyl group.

$R^{8d}$ is preferably a hydrogen atom, a $C_{1-3}$ alkyl group or a $C_{6-10}$ aryl group, more preferably a hydrogen atom, a methyl group, an ethyl group or a phenyl group.

$R^{9e}$, $R^{9f}$ and $R^{9g}$ are preferably each independently a hydrogen atom or a $C_{1-3}$ alkyl group, more preferably a hydrogen atom, a methyl group or an ethyl group.

$R^{10m}$, $R^{11m}$, $R^{12m}$ and $R^{13m}$ are preferably each independently a hydrogen atom, a $C_{1-3}$ alkyl group or -$L^{4m}$-COOR$^{5m}$, more preferably a hydrogen atom, a methyl group, an ethyl group or -$L^{4m}$-COOR$^{5m}$, provided that at least one of $R^{10m}$, $R^{11m}$, $R^{12m}$ and $R^{13m}$ is -$L^{4m}$-COOR$^{5m}$.

A particularly preferable combination of the groups in the formula (Ia) is such that $R^{1a}$ is a $C_{1-3}$ alkyl group, a chlorine atom, a hydroxy group, a methoxy group or an ethoxy group, $R^{2a}$ and $R^{3a}$ are each independently a chlorine atom, a hydroxy group, a methoxy group or an ethoxy group, Lia is a $C_{1-3}$ alkylene group, and $R^{5a}$ is a hydrogen atom, an alkali metal atom, a methyl group or an ethyl group. In this combination, particularly more preferably, $R^{1a}$, $R^{2a}$ and $R^{3a}$ are each a chlorine atom, a hydroxy group, a methoxy group or an ethoxy group, and $R^{5a}$ is a hydrogen atom, a cesium atom, a sodium atom, a methyl group or an ethyl group.

A particularly preferable combination of the groups in the formula (Ib) is such that $R^{1b}$ is a $C_{1-3}$ alkyl group, a chlorine atom, a hydroxy group, a methoxy group or an ethoxy group, $R^{2b}$ and $R^{3b}$ are each independently a chlorine atom, a hydroxy group, a methoxy group or an ethoxy group, $L^{1b}$ is a $C_{1-3}$ alkylene group (particularly more preferably —CH$_2$— or —(CH$_2$)$_3$—), and $R^{5b}$ and $R^b$ are each a hydrogen atom, an alkali metal atom, a methyl group or an ethyl group. In this combination, particularly more preferably, $R^{1b}$, $R^{2b}$ and $R^{3b}$ are each a chlorine atom, a hydroxy group, a methoxy group or an ethoxy group, and $R^{5b}$ and $R^{6b}$ are each a hydrogen atom, a cesium atom, a sodium atom, a methyl group or an ethyl group.

A particularly preferable combination of the groups in the formula (Ic) is such that $R^{1c}$ is a $C_{1-3}$ alkyl group, a chlorine atom, a hydroxy group, a methoxy group or an ethoxy group, $R^{2b}$ and $R^{3b}$ are each independently a chlorine atom, a hydroxy group, a methoxy group or an ethoxy group, and Le is a $C_{1-3}$ alkylene group (particularly more preferably —CH$_2$— or —(CH$_2$)$_3$—). In this combination, particularly more preferably, $R^{1c}$, $R^{2c}$ and $R^{3c}$ are each a chlorine atom, a hydroxy group, a methoxy group or an ethoxy group.

A particularly preferable combination of the groups in the formula (Id) is such that $R^{1d}$ is a $C_{1-3}$ alkyl group, a chlorine atom, a hydroxy group, a methoxy group or an ethoxy group, $R^{2d}$ and $R^{3d}$ are each independently a chlorine atom, a hydroxy group, a methoxy group or an ethoxy group, $L^{1d}$ is a $C_{1-3}$ alkylene group (particularly more preferably —CH$_2$— or —(CH$_2$)$_3$—), and $R^{8d}$ is a hydrogen atom, a methyl group, an ethyl group or a phenyl group. In this combination, particularly more preferably, $R^{1d}$, $R^{2d}$ and $R^{3d}$ are each a chlorine atom, a hydroxy group, a methoxy group or an ethoxy group.

A particularly preferable combination of the groups in the formula (Ie) is such that $R^{1e}$ is a $C_{1-3}$ alkyl group, a chlorine atom, a hydroxy group, a methoxy group or an ethoxy group, $R^{2e}$ and $R^{3e}$ are each independently a chlorine atom, a hydroxy group, a methoxy group or an ethoxy group, $L^{1e}$ and $L^{2e}$ are each independently a $C_{1-3}$ alkylene group (particularly more preferably, $L^{1e}$ is —(CH$_2$)$_3$—, $L^{2e}$ is —(CH$_2$)$_2$—), $R^{5e}$ is a hydrogen atom, an alkali metal atom, a methyl group or an ethyl group, and $R^{9e}$ is a hydrogen atom, a methyl group or an ethyl group. In this combination, particularly more preferably, $R^{1e}$, $R^{2e}$ and $R^{3e}$ are each a chlorine atom, a hydroxy group, a methoxy group or an ethoxy group, and $R^{5e}$ is a hydrogen atom, a cesium atom, a sodium atom, a methyl group or an ethyl group.

A particularly preferable combination of the groups in the formula (If) is such that $R^{1f}$ is a $C_{1-3}$ alkyl group, a chlorine atom, a hydroxy group, a methoxy group or an ethoxy group, $R^{2f}$ and $R^{3f}$ are each independently a chlorine atom, a hydroxy group, a methoxy group or an ethoxy group, $L^{1f}$ is a $C_{1-3}$ alkylene group (particularly more preferably —(CH$_2$)$_3$—), $R^{5f}$ and $R^{6f}$ are each a hydrogen atom, an alkali metal atom, a methyl group or an ethyl group, and $R^{9f}$ is a hydrogen atom, a methyl group or an ethyl group. In this combination, particularly more preferably, $R^{1f}$, $R^{2f}$ and $R^{3f}$ are each a chlorine atom, a hydroxy group, a methoxy group or an ethoxy group, and $R^{5f}$ and $R^{6f}$ are each a hydrogen atom, a cesium atom, a sodium atom, a methyl group or an ethyl group.

A particularly preferable combination of the groups in the formula (Ig) is such that R is a $C_{1-3}$ alkyl group, a chlorine atom, a hydroxy group, a methoxy group or an ethoxy group, $R^{2g}$ and $R^{3g}$ are each independently a chlorine atom, a hydroxy group, a methoxy group or an ethoxy group, $L^{1g}$ is a $C_{1-3}$ alkylene group (particularly more preferably —(CH$_2$)$_3$—), and $R^9$ is a hydrogen atom, a methyl group or an ethyl group. In this combination, particularly more preferably, $R^1$, $R^2$ and $R^3$ are each a chlorine atom, a hydroxy group, a methoxy group or an ethoxy group.

A particularly preferable combination of the groups in the formula (Ih) is such that $R^{1h}$ is a $C_{1-3}$ alkyl group, a chlorine atom, a hydroxy group, a methoxy group or an ethoxy group, $R^{2h}$ and $R^{3h}$ are each independently a chlorine atom, a hydroxy group, a methoxy group or an ethoxy group, $L^{1h}$, $L^{2h}$ and $L^{3h}$ are each independently a $C_{1-3}$ alkylene group (particularly more preferably $L^{1h}$ is —(CH$_2$)$_3$—, and $L^{2h}$ and $L^{3h}$ are each —CH$_2$—), and $R^{5h}$ and $R^{6h}$ are each a hydrogen atom, an alkali metal atom, a methyl group or an ethyl group. In this combination, particularly more preferably, $R^{1h}$, $R^{2h}$ and $R^{3h}$ are each a chlorine atom, a hydroxy group, a methoxy group or an ethoxy group, and $R^{5h}$ and $R^{6h}$ are each a hydrogen atom, a cesium atom, a sodium atom, a methyl group or an ethyl group.

A particularly preferable combination of the groups in the formula (Ii) is such that $R^{1i}$ is a $C_{1-3}$ alkyl group, a chlorine atom, a hydroxy group, a methoxy group or an ethoxy group, $R^{2i}$ and $R^{3i}$ are each independently a chlorine atom, a hydroxy group, a methoxy group or an ethoxy group, $L^{1i}$, $L^{2i}$, $L^{3i}$, $L^{4i}$ and $L^{5i}$ are each independently a $C_{1-3}$ alkylene group (particularly more preferably $L^{1i}$ is —$(CH_2)_3$—, $L^{2i}$ is —$(CH_2)_2$—, and $L^{3i}$, $L^{4i}$ and $L^{5i}$ are each —$CH_2$—), and $R^{5i}$, $R^{6i}$ and $R^{7i}$ are each a hydrogen atom, an alkali metal atom, a methyl group or a ethyl group. In this combination, particularly more preferably, $R^{1i}$, $R^{2i}$ and $R^{3i}$ are each a chlorine atom, a hydroxy group, a methoxy group or an ethoxy group, and $R^{5i}$, $R^{6i}$ and $R^{7i}$ are each a hydrogen atom, a cesium atom, a sodium atom, a methyl group or an ethyl group.

A particularly preferable combination of the groups in the formula (Ik) is such that $R^{1k}$ is a $C_{1-3}$ alkyl group, a chlorine atom, a hydroxy group, a methoxy group or an ethoxy group, $R^{2k}$ and $R^{3k}$ are each independently a chlorine atom, a hydroxy group, a methoxy group or an ethoxy group, $L^{1k}$ is a $C_{1-3}$ alkylene group (particularly more preferably —$CH_2$—), and $R^{5k}$ is a hydrogen atom, an alkali metal atom, a methyl group or an ethyl group. In this combination, particularly more preferably, $R^{1k}$, $R^{2k}$ and $R^{3k}$ are each a chlorine atom, a hydroxy group, a methoxy group or an ethoxy group, and $R^{5k}$ is a hydrogen atom, a cesium atom, a sodium atom, a methyl group or an ethyl group.

A particularly preferable combination of the groups in the formula (Im) is such that $R^{1m}$ is a $C_{1-3}$ alkyl group, a chlorine atom, a hydroxy group, a methoxy group or an ethoxy group, $R^{2m}$ and $R^{3m}$ are each independently a chlorine atom, a hydroxy group, a methoxy group or an ethoxy group, $R^{10m}$, $R^{11m}$, $R^{12m}$ and $R^{13m}$ are each independently a hydrogen atom, a methyl group, an ethyl group, or -$L^{4m}$-$COOR^{5m}$ provided that at least one of $R^{10m}$, $R^{11m}$, $R^{12m}$ and $R^{13m}$ is -$L^{4m}$-$COOR^{5m}$, $R^{5m}$ is a hydrogen atom, an alkali metal atom, a methyl group or an ethyl group, and $L^{1m}$, $L^{2m}$, $L^{3m}$ and $L^{4m}$ are each independently a $C_{1-3}$ alkylene group (particularly more preferably $L^{1m}$ is —$(CH_2)_3$—, $L^{2m}$ and $L^{3m}$ are each —$(CH_2)_2$—, and $L^{4m}$ is —$(CH_2)$—) (when two or more -$L^{4m}$-$COOR^{5m}$ are present, plural $L^{4m}$ may be the same as or different from each other, and plural $R^{5m}$ may be the same as or different from each other). In this combination, particularly more preferably, $R^{1m}$, $R^{2m}$ and $R^{3m}$ are each a chlorine atom, a hydroxy group, a methoxy group or an ethoxy group, and $R^{5m}$ is a hydrogen atom, a cesium atom, a sodium atom, a methyl group or an ethyl group. In this combination, when two or more -$L^{4m}$-$COOR^{5m}$ are present, plural $L^{4m}$ are preferably the same as each other and plural $R^{5m}$ are preferably the same as each other.

As compound (I), one commercially available from Tokyo Chemical Industry Co., Ltd. or the like may be used, or one synthesized by a known reaction may be used. A known reaction capable of synthesizing compound (I) is described below. However, the following reactions are examples and compound (I) synthesized by other reaction may also be used.

For example, compound (Ia) wherein $L^{1a}$ is a $C_{2-10}$ alkylene group, and $R^{1a}$-$R^{3a}$ are each a group other than a hydroxy group can be synthesized by the following hydrosilylation reaction.

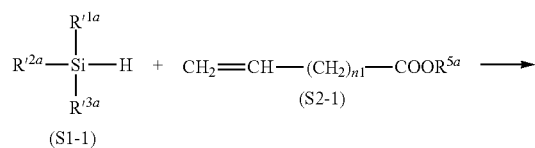

(S1-1)                (S2-1)

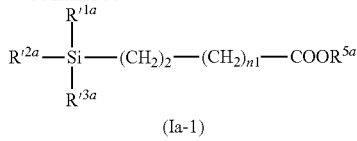

(Ia-1)

wherein n1 is an integer of 0-8, $R'^{1a}$ is a $C_{1-6}$ alkyl group, a halogen atom or a $C_{1-6}$ alkoxy group, $R'^{2a}$ and $R'^{3a}$ are each independently a halogen atom or a $C_{1-6}$ alkoxy group, and $R^{5a}$ is a hydrogen atom, an alkali metal atom or a $C_{1-6}$ alkyl group.

The hydrosilylation reaction is known as described in, for example, Chem. Commun., 2015, 51, 2339-2341 and the like, and can be performed by those of ordinary skill in the art by appropriately determining the reaction conditions by reference to the aforementioned document and the like. The hydrosilylation reaction is preferably performed using a catalyst. Examples of the catalyst include platinum catalysts (e.g., $PtO_2$).

For example, compound (Ia) wherein $L^{1a}$ is —$CH_2$—, $R^{1a}$-$R^{3a}$ are each a group other than a hydroxy group, and $R^{5a}$ is a $C_{1-6}$ alkyl group can be synthesized by the following carbene insertion reaction.

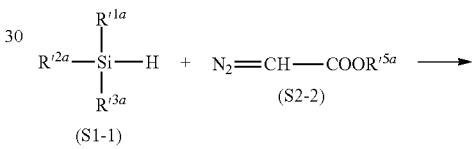

(S1-1)                (S2-2)

(Ia-2)

wherein $R'^{1a}$ is a $C_{1-6}$ alkyl group, a halogen atom or a $C_{1-6}$ alkoxy group, $R'^{2a}$ and $R'^{3a}$ are each independently a halogen atom or a $C_{1-6}$ alkoxy group, and $R'^{5a}$ is a $C_{1-6}$ alkyl group.

The carbene insertion reaction is known as described in, for example, J. Gen. Chem. USSR 1981, 51, 1537-1538 and the like, and can be performed by those of ordinary skill in the art by appropriately determining the reaction conditions by reference to the aforementioned document and the like. In addition, compound (S2-2) (i.e., diazoacetate ester) to be the starting material is available from, for example, Sigma-Aldrich Co. LLC.

For example, compound (Ia) wherein $L^{1a}$ is —$(CH_2)_2$— or —$CH(CH_3)$—, $R^{1a}$-$R^{3a}$ are each a group other than a hydroxy group, and $R^{5a}$ is a $C_{1-6}$ alkyl group can be synthesized by the following carbonylation reaction of vinylsilane.

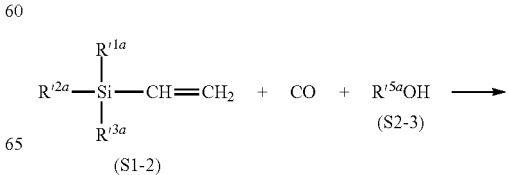

(S1-2)

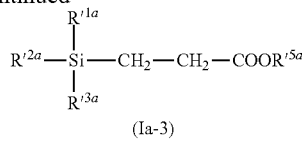

(Ia-3)

+

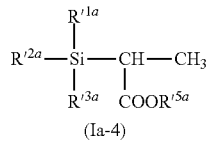

(Ia-4)

wherein $R^{\prime 1a}$ is a $C_{1-6}$ alkyl group, a halogen atom or a $C_{1-6}$ alkoxy group, $R^{\prime 2a}$ and $R^{\prime 3a}$ are each independently a halogen atom or a $C_{1-6}$ alkoxy group, and $R^{\prime 5a}$ is a $C_{1-6}$ alkyl group.

The carbonylation reaction of vinylsilane is known as described in, for example, J. Org. Chem. 1992, 57, 4189-4194 and the like, and can be performed by those of ordinary skill in the art by appropriately determining the reaction conditions by reference to the aforementioned document and the like.

Compound (Ib) can be synthesized by the above-mentioned hydrosilylation reaction or carbene insertion reaction, as in compound (Ia). Compound (Ic) having an acid anhydride group (—CO—O—CO—) can be synthesized by intramolecular condensation of compound (Ib), or hydrosilylation reaction using allylsuccinic anhydride or itaconic anhydride. Allylsuccinic anhydride and itaconic anhydride are sold by, for example, Tokyo Chemical Industry Co., Ltd. and the like. Compound (Id) having a carbonyliminocarbonyl group optionally having substituent(s) can be synthesized by reacting compound (Ic) and an amine optionally having substituent(s).

For example, compound (Ie) wherein $L^{2e}$ is a $C_{2-10}$ alkylene group, $R^{1e}$-$R^{3e}$ are each a group other than a hydroxy group, and $R^{5e}$ is a $C_{1-6}$ alkyl group can be synthesized by the following hydroamination reaction.

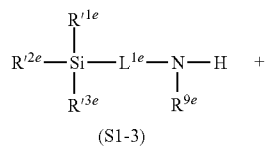

(S1-3)

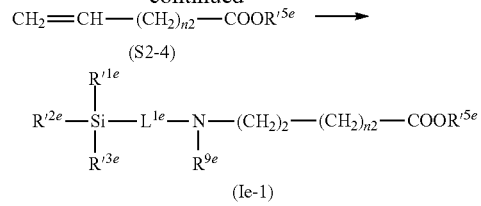

(Ie-1)

wherein n2 is an integer of 0-8, $R^{\prime 1e}$ is a $C_{1-6}$ alkyl group, a halogen atom or a $C_{1-6}$ alkoxy group, $R^{\prime 2e}$ and $R^{\prime 3e}$ are each independently a halogen atom or a $C_{1-6}$ alkoxy group, $R^{\prime 5e}$ is a $C_{1-6}$ alkyl group, $R^{9e}$ is a hydrogen atom or a $C_{1-6}$ alkyl group, and $L^{1e}$ is a $C_{1-10}$ alkylene group.

The hydroamination reaction is known as described in, for example, U.S. Pat. No. 5,364,955 and the like, and can be performed by those of ordinary skill in the art by appropriately determining the reaction conditions by reference to the aforementioned document and the like.

Compound (Ie) wherein $L^{2e}$ is a $C_{2-10}$ alkylene group, and $R^{5e}$ is a hydrogen atom (i.e., having a carboxy group) can also be synthesized by a hydroamination reaction using, as a starting material, compound (S1-3) and a compound wherein a carboxy group is protected with a silyl protecting group instead of compound (S2-4), and removing the silyl protecting group with alcohol. Such reaction using a silyl protecting group is known as described in, for example, JP-A-2012-180334 and the like and can be performed by those of ordinary skill in the art by appropriately determining the reaction conditions by reference to the aforementioned document and the like.

Compound (If) can be synthesized by the above-mentioned hydroamination reaction as in compound (Ie). Compound (Ig) having an acid anhydride group (—CO—O—CO—) can be synthesized by intramolecular condensation of compound (If).

For example, compound (Ie) wherein $R^{1e}$-$R^{3e}$ are each a group other than a hydroxy group, $R^{5e}$ is a $C_{1-6}$ alkyl group, and $R^{9e}$ is a hydrogen atom, and compound (Ih) wherein $R^{1h}$-$R^{3h}$ are each a group other than a hydroxy group, and $R^{5h}$ and $R^{6h}$ are each independently a Cis alkyl group can be synthesize by the following nucleophilic substitution reaction.

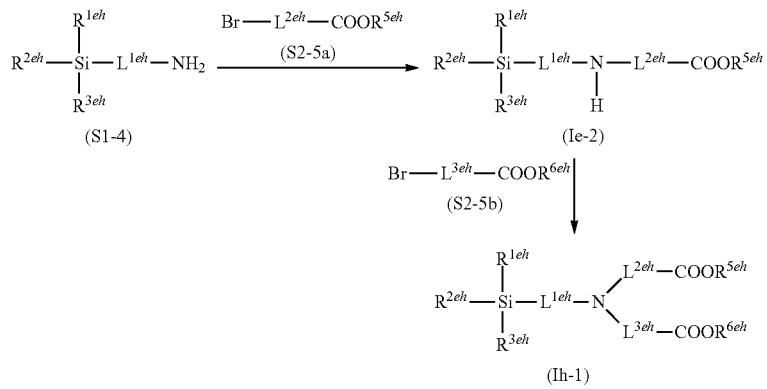

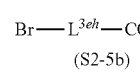

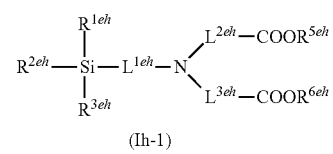

(Ih-1)

wherein $R^{1eh}$ is a $C_{1-6}$ alkyl group, a halogen atom or a $C_{1-6}$ alkoxy group, $R^{2eh}$ and $R^{3eh}$ are each independently a halogen atom or a $C_{1-6}$ alkoxy group, $R^{5eh}$ and $R^{6eh}$ are each independently a $C_{1-6}$ alkyl group, and $L^{1eh}$-$L^{3eh}$ are each independently a $C_{1-10}$ alkylene group.

The above-mentioned nucleophilic substitution reaction is known as described in, for example, RUSSIAN JOURNAL OF GENERAL CHEMISTRY, Vol. 86, No. 3, 2016, 661-667 and the like, and can be performed by those of ordinary skill in the art by appropriately determining the reaction conditions by reference to the aforementioned document and the like.

For example, compound (Ih) wherein $R^{1h}$-$R^{3h}$ are each a group other than a hydroxy group, and $R^{5h}$ and $R^{6h}$ are each independently a $C_{1-6}$ alkyl group can be synthesized by the following nucleophilic substitution reaction.

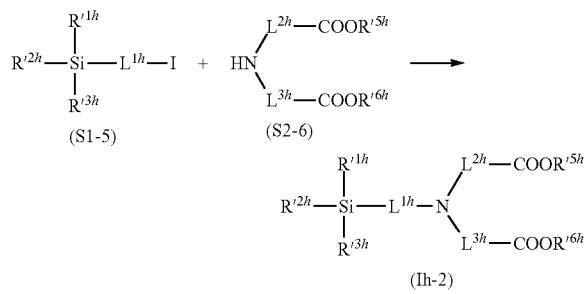

wherein $R'^{1h}$ is a $C_{1-6}$ alkyl group, a halogen atom or a $C_{1-6}$ alkoxy group, $R'^{2h}$ and $R'^{3h}$ are each independently a halogen atom or a $C_{1-6}$ alkoxy group, $R'^{5h}$ and $R'^{6h}$ are each independently a $C_{1-6}$ alkyl group, and $L^{1h}$-$L^{3h}$ are each independently a $C_{1-10}$ alkylene group.

The above-mentioned nucleophilic substitution reaction is known as described in, for example, Inorg. Chem. 2013, 52, 2044-2049 and the like, and can be performed by those of ordinary skill in the art by appropriately determining the reaction conditions by reference to the aforementioned document and the like.

Compound (Ii), compound (Ik) and compound (Im) can be each synthesized by the above-mentioned nucleophilic substitution reaction as in compound (Ih).

For example, compound (Ia) wherein $L^{1a}$ is —$CH_2$—, $R^{1a}$-$R^{3a}$ are each a group other than a hydroxy group, and $R^{5a}$ is a $C_{1-6}$ alkyl group can be synthesized by the following transmetalation reaction.

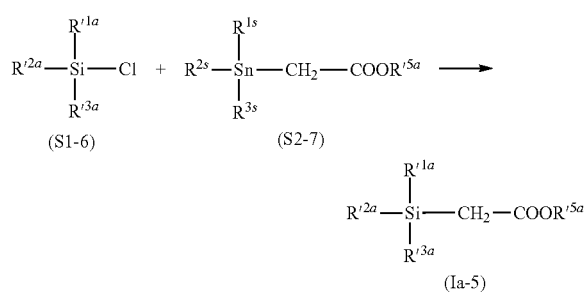

wherein $R'^{1a}$-$R'^{3a}$ are each independently a $C_{1-6}$ alkyl group, a halogen atom or a $C_{1-6}$ alkoxy group, $R'^{1s}$-$R^{3s}$ are each independently a $C_{1-6}$ alkyl group, and $R'^{5a}$ is a $C_{1-6}$ alkyl group.

The transmetalation reaction is known as described in, for example, J. Gen. Chem. USSR 1966, 36, 532 and the like, and can be performed by those of ordinary skill in the art by appropriately determining the reaction conditions by reference to the aforementioned document and the like.

Those of ordinary skill in the art can synthesize a desired reactive silicon compound by appropriately combining the above-mentioned reactions (hydrosilylation reaction, carbene insertion reaction, vinylsilane carbonylation reaction, hydroamination reaction, nucleophilic substitution reaction, transmetalation reaction).

Compound (I) can be classified into a compound of the formula (I) wherein $R^1$ is a halogen atom, a hydroxy group, or an alkoxy group optionally having substituent(s) (hereinafter "compound (I-1)"), and a compound of the formula (I) wherein $R^1$ is an alkyl group optionally having substituent(s) or an aryl group optionally having substituent(s) (hereinafter "compound (I-2)"). Using compound (I-1) as compound (I), a condensate having a crosslinked structure can be obtained. Such condensate having a crosslinked structure is preferable from the aspect of suppression of the leakage amount of a nonacidic gas.

In the condensate of compound (I), the amount of the structure derived from compound (I-1) is preferably 50-100 mol, more preferably 60-100 mol, still more preferably 70-100 mol, further preferably 80-100 mol, further more preferably 90-100 mol, particularly preferably 95-100 mol, per 100 mol of the structure derived from compound (I-1) and compound (I-2) (i.e., all compounds falling under compound (I)). Most preferably, compound (I) is entirely compound (I-1) and the structure of the condensate thereof is entirely derived from compound (I-1).

In condensation of compound (I), other compound different from compound (I) may be used in combination. That is, the condensate of compound (I) optionally has a structure derived from other compound. Only one kind of other compound may be used, or two or more kinds thereof may be used. Examples of such other compound include tetraalkoxysilane, alkoxyaluminum, alkoxytitanium, and alkoxyzirconium. Among these, tetraalkoxysilane is preferable. Examples of the tetraalkoxysilane include tetramethoxysilane, tetraethoxysilane, and tetraisopropoxysilane. The condensate of compound (I) is preferably free of a structure derived from other compound (that is, the condensate of compound (I) preferably consists of a structure derived from compound (I)).

In the condensate of compound (I), the amount of the structure derived from other compound is preferably 0-50 mol, more preferably 0-30 mol, further preferably 0-10 mol, per 100 mol of the structure derived from compound (I). The condensate of compound (I) is particularly preferably free of a so structure derived from other compound.

From the aspect of suppression of the amount of leakage of nonacidic gas, the amount of the condensate of the present invention is preferably not less than 30 parts by weight, more preferably not less than 50 parts by weight, more preferably not less than 75 parts by weight, still more preferably not less than 100 parts by weight, further preferably not less than 120 parts by weight, further more preferably not less than 130 parts by weight, and preferably not more than 1300 parts by weight, more preferably not more than 1,000 parts by weight, more preferably not more than 900 parts by weight, still more preferably not more than 800 parts by weight, further preferably not more than 850 parts by weight, further more preferably not more than 700 parts by weight, particularly preferably not more than 600 parts by weight, particularly more preferably not more than 500 parts by weight, most preferably not more than 450 parts by weight, per 100 parts by weight of the water-absorbing crosslinked polymer.

<Water-Absorbing Crosslinked Polymer>

One of the characteristics of the present invention is the use of a water-absorbing crosslinked polymer. As used herein, the "water-absorbing crosslinked polymer" is a polymer capable of forming a hydrogel by either chemical crosslinking or physical crosslinking, or both. The "chemical crosslinking" means crosslinking by a covalent bond (excluding coordinate bond). The "physical crosslinking" means crosslinking by a noncovalent bond (e.g., hydrogen bond, ionic bond, coordinate bond). Only one kind of a water-absorbing crosslinked polymer may be used, or two or more kinds thereof may be used.

Examples of the water-absorbing crosslinked polymer include acrylic acid-based water-absorbing crosslinked polymer, acrylamide-based water-absorbing crosslinked polymer, vinyl alcohol-based water-absorbing crosslinked polymer, ethylene oxide-based water-absorbing crosslinked polymer, sulfonic acid-based water-absorbing crosslinked polymer, aspartic acid-based water-absorbing crosslinked polymer, glutamic acid-based water-absorbing crosslinked polymer, alginate salt-based water-absorbing crosslinked polymer, starch-based water-absorbing crosslinked polymer, cellulose-based water-absorbing crosslinked polymer.

The water-absorbing crosslinked polymer preferably has at least one selected from the group consisting of an acidic dissociative group, an acidic dissociative group in a salt form, and a derivative group of an acidic dissociative group. An explanation on the acidic dissociative group, etc. is as mentioned above.

The water-absorbing crosslinked polymer more preferably has at least one selected from the group consisting of a carboxy group, a carboxy group in a salt form and an alkoxycarbonyl group (hereinafter sometimes to be abbreviated as "carboxy group, etc."). The carboxy group, etc. are each further preferably at least one selected from the group consisting of a carboxy group, a carboxy group in an alkali metal salt form and a $C_{1-6}$ alkoxy-carbonyl group, particularly preferably at least one selected from the group consisting of a carboxy group and a carboxy group in an alkali metal salt form.

The water-absorbing crosslinked polymer is preferably an acrylic acid-based water-absorbing crosslinked polymer having a carboxy group, etc. As used herein, the acrylic acid-based water-absorbing crosslinked polymer means a water-absorbing crosslinked polymer having a constitutional unit derived from acrylic acid.

The acrylic acid-based water-absorbing crosslinked polymer having a carboxy group, etc. optionally further has at least one selected from the group consisting of an acidic dissociative group, an acidic dissociative group in a salt form, and a derivative group of an acidic dissociative group, which is different from the carboxy group, etc. (hereinafter sometimes to be abbreviated as "other acidic dissociative group, etc."). Examples of such other acidic dissociative group, etc. include sulfo group, phosphono group, phosphonooxy group, sulfo group in salt form, phosphono group in salt form, phosphonooxy group in salt form, derivative group of sulfo group, derivative group of phosphono group and derivative group of phosphonooxy group. The other acidic dissociative group, etc. can be introduced into a water-absorbing crosslinked polymer by polymerizing a monomer having the group together with the aforementioned acrylic acid, and the like, or adding a monomer or polymer having other acidic dissociative group, etc. to the water-absorbing crosslinked polymer obtained by polymerization.

Preferable examples of the acrylic acid-based water-absorbing crosslinked polymer having a carboxy group, etc. include chemically crosslinked polyacrylic acid having a carboxy group, etc. As used herein, the "chemically crosslinked polyacrylic acid" means a polymer composed of a constitutional unit derived from a crosslinkable monomer, and at least one selected from the group consisting of a constitutional unit derived from acrylic acid and a constitutional unit derived from acrylate salt and capable of forming a hydrogel by chemical crosslinking.

Examples of the crosslinkable monomer which is one of the materials of the chemically crosslinked polyacrylic acid include 1,3-butylene glycol di(meth)acrylate, 1,4-butanediol di(meth)acrylate, 1,6-hexanediol di(meth)acrylate, neopentylglycol di(meth)acrylate, ethylene glycol di(meth)acrylate, diethylene glycol di(meth)acrylate, triethylene glycol di(meth)acrylate, tetraethylene glycol di(meth)acrylate, propylene glycol di(meth)acrylate, dipropylene glycol di(meth)acrylate, tripropylene glycol di(meth)acrylate, trimethylolpropane tri(meth)acrylate, pentaerythritol tetra(meth)acrylate, and dipentaerythritol penta(meth)acrylate.

Examples of the chemically crosslinked polyacrylic acid include "AQUPEC (registered trade mark)" available from Sumitomo Seika Chemicals Company, Limited, and "SANFRESH (registered trade mark)" available from Sanyo Chemical Industries, Ltd.

The acrylic acid-based water-absorbing crosslinked polymer having a carboxy group, etc. may contain, in addition to the constitutional units derived from acrylic acid and/or a salt thereof, constitutional units derived from at least one kind selected from the group consisting of methacrylic acid, maleic acid, fumaric acid, crotonic acid and salts thereof, vinyl alcohol, acrylamide, and methacrylamide (hereinafter sometimes to be abbreviated as "other constitutional units").

In the present specification, the "constitutional unit derived from vinyl alcohol" means a unit having a structure formed by reaction of a double bond of vinyl alcohol, and may not be formed from the vinyl alcohol itself. The "constitutional unit derived from vinyl alcohol" can be generally formed by polymerizing vinyl acetate and hydrolyzing a constitutional unit derived from vinyl acetate. In addition, the "constitutional unit derived from acrylic acid" and the like also mean the same. When an acrylic acid-based water-absorbing crosslinked polymer having a carboxy group, etc. contains other constitutional units, the water-absorbing crosslinked polymer may be any of a random copolymer, an alternating copolymer, a block copolymer and a graft copolymer.

Among the copolymers having other constitutional unit, a polyacrylic acid-poly(vinyl alcohol) copolymer capable of forming a hydrogel by physical crosslinking, and a polyacrylamide-polyacrylic acid copolymer capable of forming a hydrogel by chemical crosslinking are preferable. Examples of the aforementioned copolymers include "SS-gel (registered trade mark)" available from Sumitomo Seika Chemicals Company, Limited, a potassium salt of polyacrylamide-polyacrylic acid copolymer of "product number 432776" available from Sigma-Aldrich Co. LLC., and the like.

As an index of the degree of crosslinking of a water-absorbing crosslinked polymer, the viscosity of a 0.2 wt % aqueous solution thereof can be mentioned. From the aspects of pressure capacity, water-holding capacity and the like, the viscosity of a 0.2 wt % aqueous solution of a water-absorbing crosslinked polymer is preferably 500-50, 000 mPa·s, more preferably 800-45,000 mPa·s, further preferably 1,000-40,000 mPa·s. The viscosity value is measured by a B-type viscometer under the conditions of pH 7, temperature 25° C. and rotating speed 20 rpm.

The amount of the water-absorbing crosslinked polymer is preferably not less than 1 wt %, more preferably not less than 3 wt %, still more preferably not less than 5 wt %, further preferably not less than 6 wt %, further more preferably not less than 7 wt %, and preferably not more than 65 wt %, more preferably not more than 60 wt %, still more preferably not more than 55 wt %, further preferably not more than 50 wt %, further more preferably not more than 45 wt %, particularly preferably not more than 40 wt %, particularly more preferably not more than 35 wt %, most preferably not more than 30 wt %, based on the solid content of the gel. The solid content of the gel means a total of the component other than water and other volatile component (e.g., organic solvent used for gel production) (i.e., condensate and water-absorbing crosslinked polymer of the present invention, and any non-volatile component).

<Other Components>

The gel of the present invention may contain other components different from the condensate and water-absorbing crosslinked polymer of the present invention as long as the effect of the present invention is not markedly inhibited. Only one kind of other component may be used or two or more kinds thereof may be used.

The gel of the present invention may further contain a noncrosslinked polymer having at least one selected from the group consisting of an acidic dissociative group, an acidic dissociative group in a salt form, and a derivative group of an acidic dissociative group. The noncrosslinked polymer may be only one kind, or may include two or more kinds. In the following, the noncrosslinked polymer is sometimes to be abbreviated simply as a "polymer".

The explanation on the acidic dissociative group, etc. are as mentioned above. The noncrosslinked polymer is preferably a hydrophilic polymer (noncrosslinked polymer) having at least one selected from the group consisting of an acidic dissociative group, an acidic dissociative group in a salt form, and a derivative group of an acidic dissociative group. Examples of the hydrophilic polymer include acrylic acid-based polymer, acrylamide-based polymer, vinyl alcohol-based polymer and ethylene oxide-based polymer. The hydrophilic polymer is more preferably a water-soluble polymer.

The noncrosslinked polymer is more preferably an acrylic acid-based polymer having at least one selected from the group consisting of a carboxy group, a carboxy group in a salt form, and a derivative group of a carboxy group (hereinafter sometimes to be abbreviated as "carboxy group, etc."). The carboxy group, etc. are each preferably at least one selected from the group consisting of a carboxy group, a carboxy group in an alkali metal salt form and a $C_{1-6}$ alkoxy-carbonyl group, more preferably at least one selected from the group consisting of a carboxy group and a carboxy group in an alkali metal salt form.

The acrylic acid-based polymer having a carboxy group, etc. optionally further has at least one selected from the group consisting of an acidic dissociative group, an acidic dissociative group in a salt form, and a derivative group of an acidic dissociative group, which is different from the carboxy group, etc. (hereinafter sometimes to be abbreviated as "other acidic dissociative group, etc."). Examples of such other acidic dissociative group, etc. include sulfo group, phosphono group, phosphonooxy group, sulfo group in a salt form, phosphono group in a salt form, phosphonooxy group in a salt form, a derivative group of sulfo group, a derivative group of phosphono group and a derivative group of phosphonooxy group. The other acidic dissociative group, etc. can be introduced into an acrylic acid-based polymer by polymerizing a monomer having the group together with the aforementioned acrylic acid and/or a salt thereof, or adding a monomer or polymer having other acidic dissociative group, etc. to the obtained acrylic acid-based polymer.

An acrylic acid-based polymer having a carboxy group, etc. may contain, in addition to the constitutional units derived from acrylic acid and/or a salt thereof, constitutional units derived from at least one kind selected from the group consisting of methacrylic acid, maleic acid, fumaric acid, crotonic acid and salts thereof, vinyl alcohol, acrylamide, and methacrylamide (hereinafter sometimes to be abbreviated as "other constitutional units").

A noncrosslinked polymer is further preferably a noncrosslinked polyacrylic acid having at least one selected from the group consisting of a carboxy group and a carboxy group in a salt form. The noncrosslinked polyacrylic acid here means a polymer composed of at least one selected from the group consisting of constitutional units derived from acrylic acid and constitutional units derived from salt of acrylic acid. The noncrosslinked polymer is particularly preferably noncrosslinked polyacrylic acid having at least one selected from the group consisting of a carboxy group and a carboxy group in an alkali metal salt form.

From the aspect of flexibility of the gel, the viscosity of a 0.2 wt % aqueous noncrosslinked polymer solution is preferably 100-1,500 mPa·s, more preferably 150-1,200 mPa·s, further preferably 200-1,000 mPa·s. The viscosity value is measured by a B-type viscometer under the conditions of pH 7, temperature 25° C. and rotating speed 20 rpm.

When the aforementioned noncrosslinked polymer is used, the amount thereof is preferably 1-80 parts by weight, more preferably 1-60 parts by weight, further preferably 1-50 parts by weight, per 100 parts by weight of the water-absorbing crosslinked polymer from the aspect of membrane-forming performance.

It is preferable to use a basic compound in order to convert an acidic dissociative group and a derivative group of an acidic dissociative group which may be contained in the gel of the present invention to an acidic dissociative group in a salt form. That is, the gel of the present invention preferably contains a basic compound. The basic compound may be only one kind or two or more kinds. Examples of the basic compound include carbonates, hydrogen carbonates and hydroxides of alkali metal, and amines.

Examples of the alkali metal carbonate include lithium carbonate, sodium carbonate, potassium carbonate, rubidium carbonate, cesium carbonate and the like. Examples of the alkali metal hydrogen carbonate include lithium hydrogen carbonate, sodium hydrogen carbonate, potassium hydrogen carbonate, rubidium hydrogen carbonate, cesium hydrogen carbonate and the like. Examples of the alkali metal hydroxide include lithium hydroxide, sodium hydroxide, potassium hydroxide, rubidium hydroxide, cesium hydroxide and the like.

Examples of the amines include alkanolamines (e.g., monoethanolamine), amines having one primary amino group such as 3-amino-1-propanol and the like, amines having one secondary amino group such as diethanolamine, 2-methylaminoisopropanol and the like, amines having one tertiary amino group such as triethanolamine and the like, amines having two primary amino groups such as ethylenediamine and the like, amines having two secondary amino groups such as N,N'-bis(2-hydroxyethyl)ethylenediamine and the like, amines having one cyclic amino group such as pyrrolidine, piperidine, morpholine, N-methylmorpholine, thiomorpholine, hexamethylenimine and the like, amines having two cyclic amino groups such as piperazine, 2-methylpiperazine, 1-methylpiperazine, 1,4-dimethylpiperazine and the like, and amines having plural amino groups such as diethylenetriamine, tetraethylenepentamine and the like.

The basic compound is preferably at least one selected from the group consisting of carbonates, hydrogen carbonates and hydroxides of alkali metal, and amines, more preferably at least one selected from the group consisting of carbonates, hydrogen carbonates and hydroxides of alkali metal, further preferably at least one selected from the group consisting of carbonates, hydrogen carbonates and hydroxides of at least one alkali metal selected from the group consisting of Na, K, Rb, and Cs, particularly preferably at least one selected from the group consisting of cesium carbonate and cesium hydroxide.

The basic compound is preferably used in an amount sufficient for converting an acidic dissociative group and a derivative group of an acidic dissociative group to an acidic dissociative group in a salt form. The amount of the basic compound is preferably 1-5 mol, more preferably 1-4.5 mol, further preferably 1-4 mol, particularly preferably 1-3 mol, per 1 mol of the total of an acidic dissociative group and a derivative group of an acidic dissociative group in the materials of the gel of the present invention.

The gel of the present invention may further contain amino acids such as glycine, N-methylglycine, N,N-dimethylglycine, alanine, serine, proline, taurine, diaminopropionic acid, 2-aminopropionic acid, 2-aminoisobutyric acid, 3,4-dihydroxyphenylalanine and the like or salts thereof as an acidic gas carrier.

The gel of the present invention may also contain a filler. Only one kind of the filler may be used, or two or more kinds thereof may be used. The filler may be an organic filler or an inorganic filler. Examples of the organic filler include starch, pulp, cellulose, polystyrene-based resin, modified melanin resin, lignin, rubber powder, epoxide-based resin and the like, and biodegradable resin (e.g., polylactic acid etc.). Examples of the inorganic filler include talc, silica, diatomaceous earth, kaolin, mica, plaster, graphite, alumina, zirconia, titania and ceramics. As the filler, moreover, one treated by a known method using a known surface modifier can also be used.

The gel of the present invention may contain a surfactant. Only one kind of the surfactant may be used, or two or more kinds thereof may be used. Examples of the surfactant include polyoxyethylene polyoxypropylene glycols, polyoxyethylene alkylphenyl ethers, polyoxyethylene alkyl ethers, fluorochemical surfactant, silicone-based surfactant and the like.

The gel of the present invention may also contain water. When the gel of the present invention contains water, the content of water in the gel (i.e., amount of water relative to the whole gel is preferably 1-99.9 wt %, more preferably 3-99.9 wt %, further preferably 3-99 wt %, particularly preferably 5-98 wt %.

<Production Method of Gel>

The gel of the present invention can be produced by, for example, mixing the condensate of the present invention and a water-absorbing crosslinked polymer.

The gel of the present invention can be produced by a method including forming a second condensate of a reactive silicon compound having at least one selected from the group consisting of an acidic dissociative group, an acidic dissociative group in a salt form, and a derivative group of an acidic dissociative group by drying and heating a mixture containing at least one selected from the group consisting of a reactive silicon compound having at least one selected from the group consisting of an acidic dissociative group, an acidic dissociative group in a salt form, and a derivative group of an acidic dissociative group, and a first condensate of a reactive silicon compound having at least one selected from the group consisting of an acidic dissociative group, an acidic dissociative group in a salt form, and a derivative group of an acidic dissociative group, a water-absorbing crosslinked polymer, and water (hereinafter sometimes to be indicated as "the production method of the present invention").

The reactive silicon compound usable in the production method of the gel of the present invention, and the reactive silicon compound constituting the first condensate may be the same or different. A second condensate that can be formed by condensation of these corresponds to a condensate contained in the gel of the present invention (i.e., the condensate of the present invention). When the first condensate is used as a material, a second condensate with an increased degree of condensation is obtained. The explanation on the reactive silicon compound is as mentioned above.

The mixture used in the production method of the present invention preferably contains at least one selected from the group consisting of a reactive silicon compound having three groups selected from the group consisting of a hydroxy group and a hydrolyzable group, and an acidic dissociative group, etc., and a first condensate of a reactive silicon compound containing three groups selected from the group consisting of a hydroxy group and a hydrolyzable group, and an acidic dissociative group, etc. Using such mixture, a gel in which the second condensate and a water-absorbing crosslinked polymer form an interpenetrating network can be produced. The explanation on the water-absorbing crosslinked polymer is as mentioned above.

To simplify the operation, it is preferable to not use the first condensate in the production method of the gel of the present invention. That is, at least one selected from the group consisting of a reactive silicon compound having an acidic dissociative group, etc., and a first condensate of a reactive silicon compound having an acidic dissociative group, etc. is preferably a reactive silicon compound having an acidic dissociative group, etc., more preferably a reactive silicon compound having an acidic dissociative group, etc. and three groups selected from the group consisting of a hydroxy group and a hydrolyzable group.

The at least one selected from the group consisting of a reactive silicon compound having an acidic dissociative group, etc., and a first condensate of a reactive silicon compound having an acidic dissociative group, etc. is preferably at least one selected from the group consisting of compound (I) and a first condensate of compound (I), more preferably compound (I). Compound (I) preferably includes compound (I-1), more preferably consists of compound (I-1). The explanation on the compound (I) and compound (I-1) is as mentioned above.

The "at least one selected from the group consisting of a reactive silicon compound having an acidic dissociative group, etc., and a first condensate of a reactive silicon compound having an acidic dissociative group, etc." and "water-absorbing crosslinked polymer" in the production method of the present invention may be appropriately determined from the preset amount (e.g., the aforementioned amounts) thereof in the produced gel.

The mixture used in the production method of the present invention may further contain the aforementioned noncrosslinked polymer, basic compound, filler, surfactant, tetraalkoxysilane and the like. The explanation on the noncrosslinked polymer and the like is as mentioned above. The amount of the noncrosslinked-polymer and the like to be used in the production method of the present invention may be appropriately determined from the preset amount thereof in the produced gel.

In the production method of the present invention, the mixture preferably further contains a noncrosslinked polymer having at least one selected from the group consisting of an acidic dissociative group, an acidic dissociative group in a salt form, and a derivative group of an acidic dissociative group. The explanation of the noncrosslinked polymer is as mentioned above.

In the production method of the present invention, the mixture preferably further contains a basic compound. The explanation of the basic compound is as mentioned above.

The mixture used in the production method of the present invention optionally contains an organic solvent that does not inhibit the reaction. Only one kind of the organic solvent may be used, or two or more kinds thereof may be used. Examples of the organic solvent include protic polar organic solvents such as methanol, ethanol, 1-propanol, 2-propanol and the like; aprotic polar organic solvents such as acetone, methyl ethyl ketone, methyl isobutyl ketone, tetrahydrofuran, dioxane, N-methylpyrrolidone, N,N-dimethylacetamide, N,N-dimethylformamide and the like.

The content of water in the mixture (i.e., amount of water relative to the whole mixture) is preferably not less than 10 wt %, more preferably not less than 30 wt %, preferably not more than 99.9 wt %, more preferably not more than 95 wt %, further preferably not more than 90 wt %.

Drying of the mixture means removal of water from the mixture. When an organic solvent is co-present, the organic solvent may also be removed together with water. The mixture may be dried before heating the mixture (e.g., drying under reduced pressure), or simultaneously with heating of the mixture (e.g., drying by heating or combination of drying under reduced pressure and drying by heating). The drying is preferably performed together with heating of the mixture. The amount of water to be removed is determined by the water content of the gel obtained after heating and drying (i.e., amount of water relative to the whole gel). The water content is preferably 5-60 wt %, more preferably 5-50 wt %, further preferably 8-50 wt %, particularly preferably 10-50 wt %. When drying under reduced pressure is performed, the pressure around the mixture is preferably 1 Pa-$1.0 \times 10^5$ Pa.

The heating temperature of the mixture is preferably 50-160° C., more preferably 60-150° C., and the heating time is preferably 10 min-4 hr, more preferably 10 min-2 hr. The heating can be performed under an air atmosphere.

To control the water content of the gel during use, the mixture is dried and heated to form the second condensate, the gel of the present invention is obtained, and then water may be added to the obtained gel.

<Acidic Gas Separation Membrane>

The acidic gas separation membrane of the present invention contains the aforementioned gel. The gel in the acidic gas separation membrane preferably has a membrane shape (hereinafter sometimes to be abbreviated as "gel membrane"). That is, the acidic gas separation membrane of the present invention preferably contains a gel membrane.

The acidic gas is preferably at least one selected from the group consisting of carbon dioxide, hydrogen sulfide, carbonyl sulfide, sulfur oxide ($SO_x$), hydrogen cyanide, and nitrogen oxide ($NO_x$), more preferably at least one selected from the group consisting of carbon dioxide and hydrogen sulfide.

The thickness of the gel membrane in the acidic gas separation membrane of the present invention is preferably 0.1-600 µm, more preferably 0.5-400 µm, further preferably 1-200 µm.

The gel (particularly gel membrane) in the acidic gas separation membrane preferably contains water to perform selective separation of acidic gas from other gas by permeation through the gel. The water content of the gel (i.e., amount of water relative to the whole gel) is preferably 5-80 wt %, more preferably 5-70 wt %, further preferably 8-70 wt %, particularly preferably 10-60 wt %.

The acidic gas separation membrane of the present invention may be composed of the aforementioned gel or may contain the aforementioned gel and other member (e.g., porous membrane). The acidic gas separation membrane of the present invention preferably contains a porous membrane. The porous membrane may be a single layer membrane or a laminate membrane. The acidic gas separation membrane of the present invention more preferably has a structure in which a gel membrane is placed in between two sheets of porous membrane. The two sheets of porous membrane may be the same or different.

The porous membrane may be hydrophilic or hydrophobic. Examples of the material of the porous membrane include fluororesin, polyolefin, polyamide-based resin, polysulfone-based resin, ceramics, metal and the like. Of these, fluororesin is preferable and tetrafluoroethylene copolymer (PTFE) is more preferable. That is, the porous membrane is preferably a fluororesin porous membrane, more preferably a PTFE porous membrane.

While the thickness of the porous membrane is not particularly limited, the thickness thereof is preferably 10-3,000 µm, more preferably 10-500 µm, further preferably 15-150 µm, from the aspect of mechanical strength.

The heat resistance of the porous membrane is preferably not less than 100° C. The "heat resistance of not less than 100° C." means that a porous membrane after preservation at not less than 100° C. for 2 hr still maintains the form before preservation and is free of curl due to heat shrink or thermal melting, which curl can be confirmed by visual observation.

From the aspects of mechanical strength and adhesion to the gel of the present invention, the porosity of the porous membrane is preferably not less than 50% by volume, more preferably not less than 55% by volume, preferably not more than 99% by volume, more preferably not more than 95% by volume. From the similar aspects, the pore size of the porous membrane is preferably 0.005-10 µm, more preferably 0.005-1 µm.

The acidic gas separation membrane of the present invention can be used for, for example, a gas separation and recovery apparatus as a membrane-absorption hybrid method used in combination with the absorbing solution and the like described in JP-A-2007-297605.

<Acidic Gas Separation Apparatus>

The acidic gas separation apparatus of the present invention contains the aforementioned acidic gas separation membrane. The acidic gas separation apparatus of the present invention preferably contains an acidic gas separation membrane element and/or an acidic gas separation membrane module containing the aforementioned acidic gas separation membrane. Examples of the type of the element include spiral type, hollow fiber type, pleat type, tube type, plate & frame type and the like. The acidic gas separation membrane module contains one or more acidic gas separation membrane elements in the housing and generally has a source gas supply port, a nonpermeated gas exhaust port, a permeated gas exhaust port and, where necessary, a sweep gas supply port.

<Method for Separating Acidic Gas>

The present invention also provides a method for separating an acidic gas by contacting a mixed gas containing at least one of the aforementioned acidic gas and at least one of nonacidic gas with the acidic gas separation membrane of the present invention.

The acidic gas is preferably at least one selected from the group consisting of carbon dioxide, hydrogen sulfide, carbonyl sulfide, sulfur oxide ($SO_x$), hydrogen cyanide, and nitrogen oxide ($NO_x$), more preferably at least one selected from the group consisting of carbon dioxide and hydrogen sulfide. The nonacidic gas is preferably at least one selected from the group consisting of hydrogen, helium, hydrocarbon, nitrogen, and carbon monoxide, more preferably at least one selected from the group consisting of hydrogen, helium, hydrocarbon and nitrogen.

As the combination of the acidic gas and nonacidic gas, a combination of at least one selected from the group consisting of carbon dioxide, hydrogen sulfide, carbonyl sulfide, sulfur oxide ($SO_x$), hydrogen cyanide and nitrogen oxide ($NO_x$) as the acidic gas and at least one selected from the group consisting of hydrogen, hydrocarbon, nitrogen and carbon monoxide as the nonacidic gas is preferable, a combination of at least one selected from the group consisting of carbon dioxide and hydrogen sulfide as the acidic gas and at least one selected from the group consisting of hydrogen, helium, hydrocarbon, nitrogen and carbon monoxide as the nonacidic gas is more preferable, and a combination of at least one selected from the group consisting of carbon dioxide and hydrogen sulfide as the acidic gas and at least one selected from the group consisting of hydrogen, helium, hydrocarbon and nitrogen as the nonacidic gas is further preferable.

The mixed gas preferably contains water. The relative humidity of the mixed gas is preferably 30-100% RH, more preferably 50-100% RH, further preferably 70-100% RH. When the mixed gas is in a dry state, the gel in the acidic gas separation membrane preferably contains water.

The mixed gas preferably contains 1 ppm-60%, more preferably 1 ppm-50%, of an acidic gas. The aforementioned ppm and % are both based on the volume. The acidic gas separation method of the present invention can selectively separate an acidic gas even from a mixed gas containing the acidic gas at a low concentration. While the temperature of the mixed gas to be separated is not particularly limited, it is preferably 10-140° C., more preferably 60-100° C.

An acidic gas is selectively separated from a mixed gas containing the acidic gas and a nonacidic gas by the method of the present invention, and the acidic gas may be further separated and/or removed by a combined use of an existing desulphurization process or acidic gas separation process such as chemical absorption method and the like. In addition, the load of the existing process can be reduced by using the method of the present invention in combination with the existing desulphurization process or acidic gas separation process.

The field of application of the gas separation method of the present invention is not particularly limited. Examples of the applicable field include separation of an acidic gas from a bio gas (digestion gas) containing acidic gas generated by an anaerobic treatment method; separation of acidic gas in coal gasification electricity generation or SOFC; hydrodesulfurization and/or purification of various kinds of petroleum or gas; separation of acidic gas in natural gas plant, petroleum-associated gas plant, chemicals production plant, synthesis gas production, reforming, FOR (Enhanced Oil Recovery) or GTL (Gas to Liquid); separation of acidic gas in factory exhaust gas; air conditioning; pre-treatment for known acidic gas separation technique (adsorption separation method, chemical absorption method, cryogenic separation) or desulfurization method (dry-type desulfurization method, wet-type desulfurization method, biological desulfurization method) and the like; and replacements for known acidic gas separation technique or desulfurization method and the like.

Example

The present invention is explained in more detail in the following by referring to Examples, which do not limit the present invention. It is also possible to carry out the present invention by making appropriate modifications within the range that can conform to the above and the following gist, all of which are encompassed in the technical scope of the present invention.

Synthetic Example 1

According to the method described in Chem. Commun., 2015, 51, 2339-2341, 4-(trimethoxysilyl)butanoic acid was synthesized. To be specific, a 100 mL three-necked flask with a magnetic stirring bar, a three-way cock, a dropping funnel and a pennyhead stopper was purged with nitrogen, and $PtO_2$ (43 mg) and 3-butenoic acid (17 mL) were added. Trimethoxysilane (25 mL) was added to the dropping funnel, and trimethoxysilane was added dropwise while cooling the flask with ice water. After the completion of the dropwise addition, the mixture was stirred at room temperature for 12 hr and filtered through a PTFE filter with aperture 20 μm to give the desired 4-(trimethoxysilyl)butanoic acid (39.4 g, yield 95%).

Synthetic Example 2

By reference to RUSSIAN JOURNAL OF GENERAL CHEMISTRY, Vol. 86, No. 3, 2016, 661-667, methyl N-[3-(trimethoxysilyl)propyl]glycinate was synthesized. To be specific, a 300 mL three-necked flask with a mechanical stirring apparatus, a three-way cock, a dropping funnel and a pennyhead stopper was purged with nitrogen, and toluene (100 mL), 3-aminopropyltrimethoxysilane (30 mL), and triethylamine (118 mL) were added thereto to give a mixture. Toluene (50 mL) and methyl bromoacetate (15.7 mL) were added to the dropping funnel, and they were added dropwise to the aforementioned mixture over 1 hr. The obtained mixture was filtered, and the solid collected by filtration was washed 3 times with toluene (50 mL). Toluene used for washing was recovered, and the filtrate obtained by filtration and the recovered toluene were mixed to prepare a mixture. Toluene was evaporated from the obtained mixture under reduced pressure (10 kPa) to give the desired methyl N-[3-(trimethoxysilyl)propyl]glycinate (36.5 g, yield 77%).

$^1$H NMR (300 MHz):δ 3.66 (s, OMe, 3H), 3.52 (s, Si(OMe), 9H), 3.73 (s, CH$_2$CO, 2H), 2.56 (t, 7.2 Hz, CH$_2$, 2H), 1.59 (t-like with shoulder, CH$_2$+NH, 3H), 0.63 (t, 7.3 Hz, CH$_2$, 2H).

$^{13}$C NMR (75 MHz):δ 172.9, 52.6, 52.1, 50.6, 50.2, 23.0, 6.5.

In the present specification, "Me" indicates "CH$_3$".

Synthetic Example 3

By reference to RUSSIAN JOURNAL OF GENERAL CHEMISTRY, Vol. 86, No. 3, 2016, 661-667, a nucleophilic substitution reaction of 3-[2-(2-aminoethylamino)ethylamino]propyltrimethoxysilane represented by the formula (a) and methyl bromoacetate represented by the formula (b) was performed.

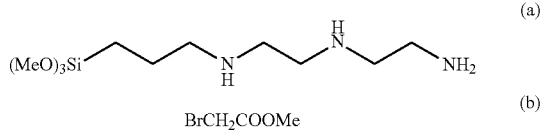

BrCH$_2$COOMe (b)

To be specific, a 500 mL three-necked flask provided with a mechanical stirring apparatus, a three-way cock, a dropping funnel and a pennyhead stopper was purged with nitrogen, and toluene (100 mL), 3-[2-(2-aminoethylamino)ethylamino]propyltrimethoxysilane (30 mL), and triethylamine (162 mL) were added thereto to give a mixture. Toluene (50 mL) and methyl bromoacetate (32.2 mL, 3 mol per 1 mol of 3-[2-(2-aminoethylamino)ethylamino]propyltrimethoxysilane) were added to the dropping funnel, and they were added dropwise to the aforementioned mixture over 1 hr. The obtained mixture was filtered, and the solid collected by filtration was washed 3 times with toluene (50 mL). Toluene used for washing was recovered, and the filtrate obtained by filtration and the recovered toluene were mixed to prepare a mixture. Toluene was evaporated from the obtained mixture under reduced pressure (10 kPa) to give a viscous liquid (48.2 g).

In $^1$H NMR and $^3$C NMR of the obtained viscous liquid, the signal was complicated and the NMR peak could not be assigned. As a result of gas chromatography mass spectrometry (GC-MS), it was found that the obtained viscous liquid was a mixture of the following 9 kinds of compounds:

monosubstituted products X1 and X2 (in each of which m/z=278, [M-COOMe]$^+$) resulting from substitution of one hydrogen atom bonded to the nitrogen atom of 3-[2-(2-aminoethylamino)ethylamino]propyltrimethoxysilane by a methoxycarbonylmethyl group, disubstituted products X3, X4 and X5 (in each of which m/z=377, [M-OMe]$^+$) resulting from substitution of two hydrogen atoms bonded to the nitrogen atom of 3-[2-(2-aminoethylamino)ethylamino]propyltrimethoxysilane by a methoxycarbonylmethyl group, trisubstituted products X6, X7 and X8 (in each of which m/z=449, [M]$^+$) resulting from substitution of three hydrogen atoms bonded to the nitrogen atom of 3-[2-(2-aminoethylamino)ethylamino]propyltrimethoxysilane by a methoxycarbonylmethyl group, and tetrasubstituted product X9 (m/z=494, [M-COOMe]$^+$) resulting from substitution of four hydrogen atoms bonded to the nitrogen atom of 3-[2-(2-aminoethylamino)ethylamino]propyltrimethoxysilane by a methoxycarbonylmethyl group. As a result of GC, the ratio of respective peak areas was X1/X2/X3/X4/X5/X6/X7/X8/X9=2/13/10/4/9/28/20/3/11.

Synthetic Example 4

By reference to RUSSIAN JOURNAL OF GENERAL CHEMISTRY, Vol. 86, No. 3, 2016, 661-667, methyl N-[3-(trimethoxysilyl)propyl]-N-methylglycinate was synthesized. To be specific, a 300 mL three-necked flask with a mechanical stirring apparatus, a three-way cock, a dropping funnel and a pennyhead stopper was purged with nitrogen, and toluene (100 mL), trimethoxy[3-(methylamino)propyl]silane (30 mL), and triethylamine (107 mL) were added thereto to give a mixture. Toluene (50 mL) and methyl bromoacetate (14.1 mL) were added to the dropping funnel, and they were added dropwise to the aforementioned mixture over 1 hr. The obtained mixture was filtered, and the solid collected by filtration was washed 3 times with toluene (50 mL). Toluene used for washing was recovered, and the filtrate obtained by filtration and the recovered toluene were mixed to prepare a mixture. Toluene was evaporated from the obtained mixture under reduced pressure (10 kPa) to give the desired methyl N-[3-(trimethoxysilyl)propyl]-N-methylglycinate (39.3 g, yield 97%).

$^1$H NMR (300 MHz):δ 3.68 (s, OMe, 3H), 3.54 (s, Si(OMe), 9H), 3.22 (s, CH$_2$CO, 2H), 2.44 (t, 7.2 Hz, CH$_2$, 2H), 2.33 (s, NCH$_3$, 3H), 1.57 (t-like with shoulder, CH$_2$+NH, 3H), 0.60 (t, 7.3 Hz, CH$_2$, 2H).

$^{13}$C NMR (75 MHz):δ 171.4, 59.9, 58.4, 51.5, 50.7, 42.3, 20.4, 6.5.

Example 1

Water (55.3 g) and cesium salt of polyacrylic acid-poly (vinyl alcohol) copolymer (copolymer capable of forming hydrogel by physical crosslinking, "SS-gel" manufactured by Sumitomo Seika Chemicals Company, Limited) (1.1 g) were mixed and stirred to give a uniform viscous solution. To the obtained viscous solution were added 4-(trimethoxysilyl)butanoic acid (1.5 g) obtained in the same manner as in Synthetic Example 1, 50 wt % aqueous cesium hydroxide solution (2.1 g) for converting carboxy group of 4-(trimethoxysilyl)butanoic acid to a salt form, and 10 wt % aqueous surfactant ("Surflon S-242" manufactured by AGC Seimi Chemical Co., Ltd.) solution (0.4 g), and they were mixed to give a coating liquid. The obtained coating liquid was applied onto a hydrophobic PTFE porous membrane ("Poreflon HP-010-50" manufactured by Sumitomo Electric Fine Polymer, Inc., membrane thickness 50 μm, pore size 0.1 μm, 40 g/m$^2$) to form a coated film, and a hydrophobic PTFE porous membrane was placed on the obtained coated film. Using a dryer, the coated film was dried and heated under the conditions of air atmosphere at about 100° C. for about 10 min to perform hydrolysis and condensation of 4-(trimethoxysilyl)butanoic acid to give a condensate thereof, from which a gas separation membrane (a-1) (thickness of gel membrane 20 μm) and a gas separation membrane (a-2) (thickness of gel membrane 10 μm) were produced. The content of water in the gel membrane in the gas separation membranes obtained in this Example was 14 wt %.

Example 2

Water (44.3 g), chemically crosslinked polyacrylic acid ("AQUPEC HV-501" manufactured by Sumitomo Seika Chemicals Company Limited) (1.1 g), noncrosslinked polyacrylic acid ("AQUPAANA AP-40F" manufactured by Sumitomo Seika Chemicals Company Limited) (0.2 g), and 50 wt % aqueous cesium hydroxide solution (5.0 g) for converting carboxy group to a salt form were mixed and stirred to give a uniform viscous solution. To the obtained viscous solution were added 4-(trimethoxysilyl)butanoic acid (3.7 g) obtained in the same manner as in Synthetic Example 1, 50 wt % aqueous cesium hydroxide solution (5.3 g) for converting carboxy group of 4-(trimethoxysilyl)butanoic acid to a salt form, and 10 wt % aqueous surfactant ("Surflon S-242" manufactured by AGC Seimi Chemical Co., Ltd.) solution (0.4 g), and they were mixed to give a coating liquid. In the same manner as in Example 1, a gas separation membrane (b-1) (thickness of gel membrane 20 μm) and a gas separation membrane (b-2) (thickness of gel membrane 10 μm) were produced. The content of water in the gel membrane in the gas separation membranes obtained in this Example was 11 wt %.

Example 3

Water (46.4 g), chemically crosslinked polyacrylic acid ("AQUPEC HV-501" manufactured by Sumitomo Seika Chemicals Company Limited) (1.1 g) and 50 wt % aqueous cesium hydroxide solution (4.5 g) for converting carboxy group to a salt form were mixed and stirred to give a uniform viscous solution. To the obtained viscous solution were added 4-(trimethoxysilyl)butanoic acid (3.1 g) obtained in the same manner as in Synthetic Example 1, 50 wt % aqueous cesium hydroxide solution (4.5 g) for converting carboxy group of 4-(trimethoxysilyl)butanoic acid to a salt form, and 10 wt % aqueous surfactant ("Surflon S-242" manufactured by AGC Seimi Chemical Co., Ltd.) solution (0.4 g), and they were mixed to give a coating liquid. In the same manner as in Example 1, a gas separation membrane (c-1) (thickness of gel membrane 20 μm) and a gas separation membrane (c-2) (thickness of gel membrane 10 μm) were produced. The content of water in the gel membrane in the gas separation membranes obtained in this Example was 12 wt %.

Example 4

Water (38.1 g), chemically crosslinked polyacrylic acid ("AQUPEC HV-501" manufactured by Sumitomo Seika Chemicals Company Limited) (1.1 g), noncrosslinked polyacrylic acid ("AQUPAANA AP-40F" manufactured by Sumitomo Seika Chemicals Company Limited) (0.2 g) and 50 wt % aqueous cesium hydroxide solution (5.0 g) for converting carboxy group to a salt form were mixed and stirred to give a uniform viscous solution. To the obtained viscous solution were added [3-(trimethoxysilyl)propyl]succinic anhydride (4.6 g, purchased from Tokyo Chemical Industry Co., Ltd., product code T3360), 50 wt % aqueous cesium hydroxide solution (10.6 g) for forming a carboxy group in a salt form (—COOCs) by hydrolyzing an acid anhydride group (—CO—O—CO—) of [3-(trimethoxysilyl)propyl]succinic anhydride, and 10 wt % aqueous surfactant ("Surflon S-242" manufactured by AGC Seimi Chemical Co., Ltd.) solution (0.4 g), and they were mixed to give a coating liquid. In the same manner as in Example 1, a gas separation membrane (d-1) (thickness of gel membrane 20 μm) and a gas separation membrane (d-2) (thickness of gel membrane 10 μm) were produced. The content of water in the gel membrane in the gas separation membranes obtained in this Example was 18 wt %.

Example 5

Water (37.4 g), chemically crosslinked polyacrylic acid ("AQUPEC HV-501" manufactured by Sumitomo Seika Chemicals Company Limited) (1.3 g), and 50 wt % aqueous cesium hydroxide solution (5.4 g) for converting carboxy group to a salt form were mixed and stirred to give a uniform viscous solution. To the obtained viscous solution were added [3-(trimethoxysilyl)propyl]succinic anhydride (4.7 g, purchased from Tokyo Chemical Industry Co., Ltd., product code T3360), 50 wt % aqueous cesium hydroxide solution (10.8 g) for forming a carboxy group in a salt form (—COOCs) by hydrolyzing an acid anhydride group (—C(O)—O—C(O)—) of [3-(trimethoxysilyl)propyl]succinic anhydride, and 10 wt % aqueous surfactant ("Surflon S-242" manufactured by AGC Seimi Chemical Co., Ltd.) solution (0.4 g), and they were mixed to give a coating liquid. In the same manner as in Example 1, a gas separation membrane (e-1) (thickness of gel membrane 20 μm) and a gas separation membrane (e-2) (thickness of gel membrane 10 μm) were produced. The content of water in the gel membrane in the gas separation membranes obtained in this Example was 10 wt %.

Example 6

Water (51.4 g) and potassium salt of polyacrylamide-polyacrylic acid copolymer (copolymer capable of forming hydrogel by chemical crosslinking, purchased from Sigma-Aldrich Co. LLC., "product number 432776") (1.1 g) were mixed and stirred to give a uniform viscous solution. To the obtained viscous solution were added 4-(trimethoxysilyl)butanoic acid (2.93 g) obtained in the same manner as in Synthetic Example 1, 50 wt % aqueous cesium hydroxide solution (4.2 g) for converting carboxy group of 4-(trimethoxysilyl)butanoic acid to a salt form, and 10 wt % aqueous surfactant ("Surflon S-242" manufactured by AGC Seimi Chemical Co., Ltd.) solution (0.4 g), and they were mixed to give a coating liquid. In the same manner as in Example 1, a gas separation membrane (f-1) (thickness of gel membrane 20 μm) and a gas separation membrane (e-2) (thickness of gel membrane 10 μm) were produced. The content of water in the gel membrane in the gas separation membranes obtained in this Example was 17 wt %.

Example 7

Water (48.4 g) and chemically crosslinked polyacrylic acid ("AQUPEC HV-501" manufactured by Sumitomo Seika Chemicals Company Limited) (1.1 g), noncrosslinked polyacrylic acid ("AQUPAANA AP-40F" manufactured by Sumitomo Seika Chemicals Company Limited) (0.2 g) and 25 wt % aqueous sodium hydroxide solution (2.7 g) for converting carboxy group to a salt form were mixed and stirred to give a uniform viscous solution. To the obtained viscous solution were added methyl N-[3-(trimethoxysilyl)propyl]glycinate (4.4 g) obtained in the same manner as in Synthetic Example 2, 25 wt % aqueous sodium hydroxide solution (2.8 g) for converting ester group (—COOMe) of methyl N-[3-(trimethoxysilyl)propyl]glycinate to a salt form by hydrolysis, and 10 wt % aqueous surfactant ("Surflon S-242" manufactured by AGC Seimi Chemical Co., Ltd.) solution (0.4 g), and they were mixed to give a coating liquid. In the same manner as in Example 1, a gas separation membrane (g-1) (thickness of gel membrane 20 μm) and a gas separation membrane (g-2) (thickness of gel membrane 10 μm) were produced. The content of water in the gel membrane in the gas separation membranes obtained in this Example was 20 wt %.

Example 8

Water (33.9 g), chemically crosslinked polyacrylic acid ("AQUPEC HV-501" manufactured by Sumitomo Seika Chemicals Company Limited) (1.1 g), noncrosslinked polyacrylic acid ("AQUPAANA AP-40F" manufactured by Sumitomo Seika Chemicals Company Limited) (0.2 g), and 50 wt % aqueous cesium hydroxide solution (5.0 g) for converting carboxy group to a salt form were mixed and stirred to give a uniform viscous solution. To the obtained viscous solution were added methyl N-[3-(trimethoxysilyl)propyl]glycinate (8.9 g) obtained in the same manner as in Synthetic Example 2, 50 wt % aqueous cesium hydroxide solution (10.6 g) for converting ester group (—COOMe) of methyl N-[3-(trimethoxysilyl)propyl]glycinate to a salt form by hydrolysis, and 10 wt % aqueous surfactant ("Surflon S-242" manufactured by AGC Seimi Chemical Co., Ltd.) solution (0.4 g), and they were mixed to give a coating liquid. In the same manner as in Example 1, a gas separation membrane (h-1) (thickness of gel membrane 20 μm) and a gas separation membrane (h-2) (thickness of gel membrane 10 μm) were produced. The content of water in the gel membrane in the gas separation membranes obtained in this Example was 14 wt %.

As a result of solid $^2$Si NMR measurement of the gas separation membrane (h-1), the signal intensities of T3 and T2 were 77 and 23, respectively, when the signal intensity of all silicon was 100, and the signals of T1 and T0 were not observed. As the solid $^2$Si NMR, $^2$Si nuclear (79.42 MHz) was measured with a single pulse (with decoupling) using "JEOL ECA-400" manufactured by JEOL Ltd. The measurement conditions were MAS (Magic Angle Spinning): 3 KHz, pulse width: 45°, and waiting time: 300 sec.

Example 9

Water (41.3 g), chemically crosslinked polyacrylic acid ("AQUPEC HV-501" manufactured by Sumitomo Seika Chemicals Company Limited) (1.1 g), noncrosslinked polyacrylic acid ("AQUPAANA AP-40F" manufactured by Sumitomo Seika Chemicals Company Limited) (0.2 g), and 50 wt % aqueous cesium hydroxide solution (5.0 g) for converting carboxy group to a salt form were mixed and stirred to give a uniform viscous solution. To the obtained viscous solution were added a viscous liquid (i.e., mixture of 9 kinds of compounds) (4.1 g) obtained in the same manner as in Synthetic Example 3, 50 wt % aqueous cesium hydroxide solution (8.0 g) for converting ester group (—COOMe) contained in the aforementioned mixture to a salt form by hydrolysis, and 10 wt % aqueous surfactant ("Surflon S-242" manufactured by AGC Seimi Chemical Co., Ltd.) solution (0.4 g), and they were mixed to give a coating liquid. In the same manner as in Example 1, a gas separation membrane (g-1) (thickness of gel membrane 20 μm) and a gas separation membrane (g-2) (thickness of gel membrane 10 μm) were produced. The content of water in the gel membrane in the gas separation membranes obtained in this Example was 18 wt %.

Example 10

Water (48.3 g), chemically crosslinked polyacrylic acid ("AQUPEC HV-501" manufactured by Sumitomo Seika Chemicals Company Limited) (1.1 g), noncrosslinked polyacrylic acid ("AQUPAANA AP-40F" manufactured by Sumitomo Seika Chemicals Company Limited) (0.2 g), and 50 wt % aqueous cesium hydroxide solution (5.0 g) for converting carboxy group to a salt form were mixed and stirred to give a uniform viscous solution. To the obtained viscous solution were added methyl N-[3-(trimethoxysilyl)propyl]-N-methylglycinate (2.3 g) obtained in the same manner as in Synthetic Example 4, 50 wt % aqueous cesium hydroxide solution (2.7 g) for converting ester group (—COOMe) of methyl N-[3-(trimethoxysilyl)propyl]-N-methylglycinate to a salt form by hydrolysis, and 10 wt % aqueous surfactant ("Surflon S-242" manufactured by AGC Seimi Chemical Co., Ltd.) solution (0.4 g), and they were mixed to give a coating liquid. In the same manner as in Example 1, a gas separation membrane (i-1) (thickness of gel membrane 20 μm) and a gas separation membrane (i-2) (thickness of gel membrane 10 μm) were produced. The content of water in the gel membrane in the gas separation membranes obtained in this Example was 16 wt %.

Comparative Example 1

Water (55.3 g) and cesium salt of polyacrylic acid-poly(vinyl alcohol) copolymer (copolymer capable of forming hydrogel by physical crosslinking, "SS-gel" manufactured by Sumitomo Seika Chemicals Company, Limited) (1.9 g) were mixed and stirred to give a uniform viscous solution. To the obtained viscous solution was added 10 wt % aqueous surfactant ("Surflon S-242" manufactured by AGC Seimi Chemical Co., Ltd.) solution (0.4 g), and they were mixed to give a coating liquid. In the same manner as in Example 1, a gas separation membrane (x-1) (thickness of gel membrane 20 μm) and a gas separation membrane (x-2) (thickness of gel membrane 10 μm) were produced.

Comparative Example 2

Water (53.0 g), chemically crosslinked polyacrylic acid ("AQUPEC HV-501" manufactured by Sumitomo Seika Chemicals Company Limited) (1.3 g), and 50 wt % aqueous cesium hydroxide solution (5.3 g) for converting carboxy group to a salt form were mixed and stirred to give a uniform viscous solution. To the obtained viscous solution was added 10 wt % aqueous surfactant ("Surflon S-242" manufactured by AGC Seimi Chemical Co., Ltd.) solution (0.4 g), and they were mixed to give a coating liquid. In the same manner as in Example 1, a gas separation membrane (y-1) (thickness of gel membrane 20 μm) and a gas separation membrane (y-2) (thickness of gel membrane 10 μm) were produced.

(Performance Evaluation)

(1) Gas Separation Performance

Using a gas separation apparatus with a flat membrane cell 51 of gas separation membrane, which is shown in FIG. 1, gas separation performance of a gas separation membrane was evaluated. To be specific, the gas separation membranes produced in the Examples and Comparative Examples were cut into a flat membrane shape with an appropriate size, and fixed between a supply side 52 and a permeation side 53 of each stainless flat membrane cell 51. A mixed gas ($CO_2$: 101 mL/min, He: 199 mL/min, water (liquid): 326 μL/min) was supplied through a flow controller MFC to the supply side 52, and a sweep gas (Ar: 30 mL/min, water (liquid):42 μL/min) was supplied to the permeation side 53 (water was supplied via respective feed pumps 58, 60). Using back pressure controllers 55 and 59, a back pressure of the supply side was adjusted to 125 kPa (absolute pressure) and a back pressure of the permeation side was adjusted on the permeation side to 0 kPa (gauge pressure). The gas flow after removal of the water vapor in the sweep gas discharged from the permeation side 53 by the cooling trap 56 was quantified based on the analysis results of the gas chromatograph 57, and the permeance (mol/m²/sec/kPa) of $CO_2$ and He contained in the permeated gas was calculated. The cell 51 was maintained at 96° C. The results are shown in Table 1.

(2) Amount of Leakage of Nitrogen Gas

Figure 2:
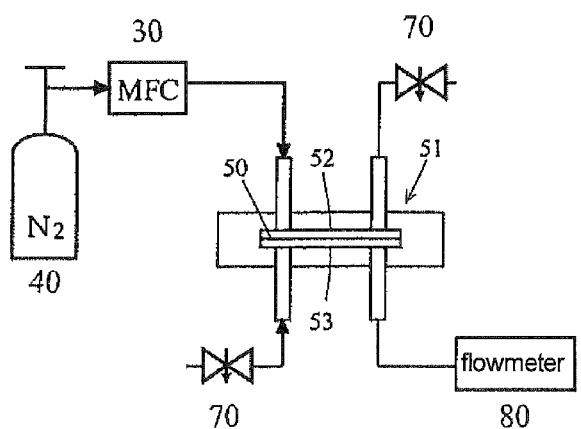
FIG. 2 is a schematic drawing of the apparatus used for measurement of the leakage amount of a nitrogen gas of the gas separation membranes obtained in the Examples and Comparative Examples.

Using a gas separation apparatus with a flat membrane cell 51 of gas separation membrane, which is shown in FIG. 2, gas separation performance of a gas separation membrane was evaluated. To be specific, the gas separation membranes produced in the Examples and Comparative Examples were cut into a flat membrane shape with an appropriate size, and fixed between a supply side 52 and a permeation side 53 of each stainless flat membrane cell 51. Nitrogen gas was supplied at a rate of 1.2 MPa (gauge pressure)/min through a flow controller MFC to the supply side 52 by pressurizing from 0 MPa (gauge pressure) to 0.8 MPa (gauge pressure). In this case, valve 70 remained closed. Using a flowmeter 80, the amount of leakage of the nitrogen gas that permeated through the gas separation membrane was measured. Cell 51 was maintained at room temperature. The results are shown in Table 2.

TABLE 1

Gas separation performance

| gas separation membrane | permeance (mol/m²/sec/kPa) | |
| --- | --- | --- |
| | $CO_2$ | He |
| Example 1 (a-1) | 4.34 × 10⁻⁶ | 2.48 × 10⁻⁷ |
| Example 2 (b-1) | 1.57 × 10⁻⁵ | 4.16 × 10⁻⁷ |
| Example 3 (c-1) | 1.33 × 10⁻⁵ | 2.78 × 10⁻⁷ |
| Example 4 (d-1) | 1.09 × 10⁻⁵ | 3.13 × 10⁻⁷ |
| Example 5 (e-1) | 1.11 × 10⁻⁵ | 4.78 × 10⁻⁷ |
| Example 6 (f-1) | 8.47 × 10⁻⁷ | 3.17 × 10⁻⁷ |
| Example 7 (g-1) | 8.15 × 10⁻⁶ | 1.47 × 10⁻⁷ |
| Example 8 (h-1) | 2.65 × 10⁻⁵ | 6.21 × 10⁻⁷ |
| Example 9 (i-1) | 3.46 × 10⁻⁵ | 3.15 × 10⁻⁷ |
| Example 10 (j-1) | 1.72 × 10⁻⁵ | 3.69 × 10⁻⁷ |
| Comparative Example 1 (x-1) | 5.02 × 10⁻⁶ | 6.04 × 10⁻⁷ |
| Comparative Example 2 (y-1) | 1.20 × 10⁻⁵ | 1.90 × 10⁻⁷ |

TABLE 2

Amount of leakage of nitrogen gas

| gas separation membrane | amount of leak (mL/h) |
| --- | --- |
| Example 1 (a-2) | 10.0 |
| Example 2 (b-2) | 7.2 |
| Example 3 (c-2) | 2.4 |
| Example 4 (d-2) | 2.5 |
| Example 5 (e-2) | less than 0.1 |
| Example 6 (f-2) | 4.1 |
| Example 7 (g-2) | 3.9 |
| Example 8 (h-2) | 5.2 |
| Example 9 (i-2) | 4.6 |
| Example 10 (j-2) | 3.0 |
| Comparative Example 1 (x-2) | 13.5 |
| Comparative Example 2 (y-2) | 11.8 |

INDUSTRIAL APPLICABILITY

The gel of the present invention is useful for an acidic gas separation membrane.

This application is based on a patent application No. 2018-122480 filed in Japan, the contents of which are incorporated in full herein.

EXPLANATION OF SYMBOLS 30, 31, 32 flow controller (mass flow controller)
40 $CO_2$ cylinder
41 He cylinder
42 Ar cylinder
51 gas separation membrane module (50: membrane, 52: supply side, 53: permeation side)
54, 56 cold trap
55, 59 back pressure controller
57 gas chromatograph
58, 60 metering pump
70 valve
80 flowmeter

The invention claimed is:

1. A gel comprising a water-absorbing crosslinked polymer, and a condensate of a reactive silicon compound having at least one selected from the group consisting of an acidic dissociative group, an acidic dissociative group in a salt form, and a derivative group of an acidic dissociative group, wherein the condensate of the reactive silicon compound and the water-absorbing crosslinked polymer form an interpenetrating network.

2. The gel according to claim 1, wherein the reactive silicon compound is a compound represented by the formula (I):

wherein $R^1$ is an alkyl group optionally having substituent(s), an aryl group optionally having substituent(s), a halogen atom, a hydroxy group, or an alkoxy group optionally having substituent(s), $R^2$ and $R^3$ are each independently a halogen atom, a hydroxy group, or an alkoxy group optionally having substituent(s), and $R^4$ is an organic group having at least one selected from the group consisting of an acidic dissociative group, an acidic dissociative group in a salt form, and a derivative group of an acidic dissociative group, the organic group is an alkyl group optionally having substituent(s) or a cycloalkyl-alkyl group optionally having substituent(s), and one or more carbon atoms (excluding carbon atom adjacent to silicon atom and carbon atom adjacent to nitrogen atom) of the alkyl group or the cycloalkyl-alkyl group is/are optionally substituted by a nitrogen atom.

3. The gel according to claim 2, wherein $R^4$ is an organic group having at least one selected from the group consisting of a carboxy group, a carboxy group in a salt form, an alkoxycarbonyl group optionally having substituent(s), a carbonyloxycarbonyl group, and a carbonyliminocarbonyl group optionally having substituent(s).

4. The gel according to claim 1, wherein the water-absorbing crosslinked polymer has at least one selected from the group consisting of an acidic dissociative group, an acidic dissociative group in a salt form, and a derivative group of an acidic dissociative group.

5. The gel according to claim 1, wherein the water-absorbing crosslinked polymer has at least one selected from the group consisting of a carboxy group, a carboxy group in a salt form and an alkoxycarbonyl group.

6. An acidic gas separation membrane comprising a gel comprising a water-absorbing crosslinked polymer, and a condensate of a reactive silicon compound having at least one selected from the group consisting of an acidic dissociative group, an acidic dissociative group in a salt form, and a derivative group of an acidic dissociative group.

7. An acidic gas separation apparatus comprising the acidic gas separation membrane according to claim 6.

8. A method for separating at least one acidic gas, comprising contacting a mixed gas comprising the acidic gas and at least one nonacidic gas with the acidic gas separation membrane according to claim 6.

9. A method for producing a gel comprising a water-absorbing crosslinked polymer, and a condensate of a reactive silicon compound having at least one selected from the group consisting of an acidic dissociative group, an acidic dissociative group in a salt form, and a derivative group of an acidic dissociative group, the method comprising forming a second condensate of a reactive silicon compound having at least one selected from the group consisting of an acidic dissociative group, an acidic dissociative group in a salt form, and a derivative group of an acidic dissociative group by drying and heating a mixture comprising at least one selected from the group consisting of a reactive silicon compound having at least one selected from the group consisting of an acidic dissociative group, an acidic dissociative group in a salt form, and a derivative group of an acidic dissociative group, and a first condensate of a reactive silicon compound having at least one selected from the group consisting of an acidic dissociative group, an acidic dissociative group in a salt form, and a derivative group of an acidic dissociative group, a water-absorbing crosslinked polymer, and water.

10. The method according to claim 9, wherein the reactive silicon compound is a compound represented by the formula (I):

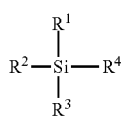

wherein $R^1$ is an alkyl group optionally having substituent(s), an aryl group optionally having substituent(s), a halogen atom, a hydroxy group, or an alkoxy group optionally having substituent(s), $R^2$ and $R^3$ are each independently a halogen atom, a hydroxy group, or an alkoxy group optionally having substituent(s), and $R^4$ is an organic group having at least one selected from the group consisting of an acidic dissociative group, an acidic dissociative group in a salt form, and a derivative group of an acidic dissociative group, the organic group is an alkyl group optionally having substituent(s) or a cycloalkyl-alkyl group optionally having substituent(s), and one or more carbon atoms (excluding carbon atom adjacent to silicon atom and carbon atom adjacent to nitrogen atom) of the alkyl group or the cycloalkyl-alkyl group is/are optionally substituted by a nitrogen atom.

11. The method according to claim 10, wherein $R^4$ is an organic group having at least one selected from the group consisting of a carboxy group, a carboxy group in a salt form, an alkoxycarbonyl group optionally having substituent(s), a carbonyloxycarbonyl group, and a carbonyliminocarbonyl group optionally having substituent(s).

12. The method according to claim 9, wherein the water-absorbing crosslinked polymer has at least one selected from the group consisting of an acidic dissociative group, an acidic dissociative group in a salt form, and a derivative group of an acidic dissociative group.

13. The method according to claim 9, wherein the water-absorbing crosslinked polymer has at least one selected from the group consisting of a carboxy group, a carboxy group in a salt form and an alkoxycarbonyl group.

14. The method according to claim 9, wherein the condensate of the reactive silicon compound and the water-absorbing crosslinked polymer form an interpenetrating network.

15. The acidic gas separation membrane according to claim 6, wherein the reactive silicon compound is a compound represented by the formula (I):

wherein $R^1$ is an alkyl group optionally having substituent(s), an aryl group optionally having substituent(s), a halogen atom, a hydroxy group, or an alkoxy group optionally having substituent(s), $R^2$ and $R^3$ are each independently a halogen atom, a hydroxy group, or an alkoxy group optionally having substituent(s), and $R^4$ is an organic group having at least one selected from the group consisting of an acidic dissociative group, an acidic dissociative group in a salt form, and a derivative group of an acidic dissociative group, the organic group is an alkyl group optionally having substituent(s) or a cycloalkyl-alkyl group optionally having substituent(s), and one or more carbon atoms (excluding carbon atom adjacent to silicon atom and carbon atom adjacent to nitrogen atom) of the alkyl group or the cycloalkyl-alkyl group is/are optionally substituted by a nitrogen atom.

16. The acidic gas separation membrane according to claim 15, wherein $R^4$ is an organic group having at least one selected from the group consisting of a carboxy group, a carboxy group in a salt form, an alkoxycarbonyl group optionally having substituent(s), a carbonyloxycarbonyl group, and a carbonyliminocarbonyl group optionally having substituent(s).

17. The acidic gas separation membrane according to claim 6, wherein the water-absorbing crosslinked polymer has at least one selected from the group consisting of an acidic dissociative group, an acidic dissociative group in a salt form, and a derivative group of an acidic dissociative group.

18. The acidic gas separation membrane according to claim 6, wherein the water-absorbing crosslinked polymer has at least one selected from the group consisting of a carboxy group, a carboxy group in a salt form and an alkoxycarbonyl group.

19. The acidic gas separation membrane according to claim 6, wherein the condensate of the reactive silicon compound and the water-absorbing crosslinked polymer form an interpenetrating network.

* * * * *